US012552051B2

(12) United States Patent
Uemizo et al.

(10) Patent No.: US 12,552,051 B2
(45) Date of Patent: Feb. 17, 2026

(54) OBJECT CONVEYING ROBOT

(71) Applicant: Japan Cash Machine Co., Ltd., Osaka (JP)

(72) Inventors: Yoshiaki Uemizo, Osaka (JP); Takashi Ueda, Osaka (JP); Tomonori Kitano, Osaka (JP); Shin Iose, Osaka (JP); Kazuyoshi Nakatani, Osaka (JP); Yoshimi Ezawa, Osaka (JP)

(73) Assignee: Japan Cash Machine, Co., Ltd. (JP)

( * ) Notice: Subject to any disclaimer, the term of this patent is extended or adjusted under 35 U.S.C. 154(b) by 894 days.

(21) Appl. No.: 17/654,212

(22) Filed: Mar. 9, 2022

(65) Prior Publication Data

US 2022/0288797 A1    Sep. 15, 2022

(30) Foreign Application Priority Data

Mar. 11, 2021  (JP) ................................. 2021-039180
Mar. 11, 2021  (JP) ................................. 2021-039181
Mar. 11, 2021  (JP) ................................. 2021-039183

(51) Int. Cl.
*B25J 15/08*    (2006.01)
*B25J 9/16*     (2006.01)

(52) U.S. Cl.
CPC ............. *B25J 15/08* (2013.01); *B25J 9/1664* (2013.01)

(58) Field of Classification Search
CPC ........ B25J 18/025; B25J 15/0616–0691; B25J 9/106; B25J 9/1065; B65G 17/323; B65G 17/1485; B65G 17/91–918; B65G 57/04; B65G 59/04
See application file for complete search history.

(56) References Cited

U.S. PATENT DOCUMENTS

2005/0079041 A1* 4/2005 Campbell ........... H01L 21/6773
                                                414/626
2020/0353630 A1* 11/2020 Roulet-Dubonnet .... B25J 18/02
2021/0138629 A1*  5/2021 Stehr .......................... B25J 5/00
                    (Continued)

FOREIGN PATENT DOCUMENTS

CA        3084270 A1      6/2019
CN      111993338 A   * 11/2020  ............. B25B 27/00
                    (Continued)

OTHER PUBLICATIONS

Canadian Office Action dated Sep. 27, 2024, Application No. 3199915 (7 pages).

*Primary Examiner* — Gerald McClain
(74) *Attorney, Agent, or Firm* — FisherBroyles, LLP; Rob L. Phillips

(57) ABSTRACT

A conveying robot/system configured to: (i) operate within limitations of spaces defined by shelving, (ii) remove or place an object in spaces defined by shelving and (iii) enable an object to be automatically placed at a conveying-in position of a conveying processing system and manipulate the object's posture so that the object's posture changes from the object being conveyed to the object being processed. The system includes one or more of a robot hand with a grasping portion, articulated link mechanism, object placing shelf, box body, key and a lock. In one version, the box body is a bill storage container of the type used to store currency, coupons and tickets in electronic gaming devices located in a casino environment.

7 Claims, 30 Drawing Sheets

(56) References Cited

U.S. PATENT DOCUMENTS

| | | | | |
|---|---|---|---|---|
| 2021/0139294 A1* | 5/2021 | Stehr | ................... | B66F 7/0666 |
| 2024/0009863 A1* | 1/2024 | Fitch | ................... | B25J 15/0014 |
| 2024/0286289 A1* | 8/2024 | Ueda | ................... | B25J 9/1687 |
| 2024/0308767 A1* | 9/2024 | Li | ................... | B65G 1/0407 |

FOREIGN PATENT DOCUMENTS

| | | | | |
|---|---|---|---|---|
| JP | S5675327 | A | | 6/1981 |
| JP | S6236204 | A | | 2/1987 |
| JP | S62239293 | A | | 10/1987 |
| JP | S6420606 | U | * | 2/1989 |
| JP | 02303777 | A | | 12/1990 |
| JP | 04092071 | A | | 3/1992 |
| JP | H04128994 | A | | 4/1992 |
| JP | H0531889 | U | * | 4/1993 |
| JP | H05031889 | U | | 4/1993 |
| JP | H06074289 | U | | 10/1994 |
| JP | H079372 | A | | 1/1995 |
| JP | 2003159680 | A | | 6/2003 |
| JP | 2008254900 | A | | 10/2008 |
| JP | 2009102134 | A | | 5/2009 |
| JP | 2014223718 | A | | 12/2014 |
| JP | 2018089719 | A | | 6/2018 |
| JP | 2019028730 | A | | 2/2019 |
| JP | 2020057431 | A | | 4/2020 |
| JP | 2020073297 | A | | 5/2020 |
| JP | 6716177 | B | | 7/2020 |
| WO | 2014088415 | A1 | | 6/2014 |

* cited by examiner

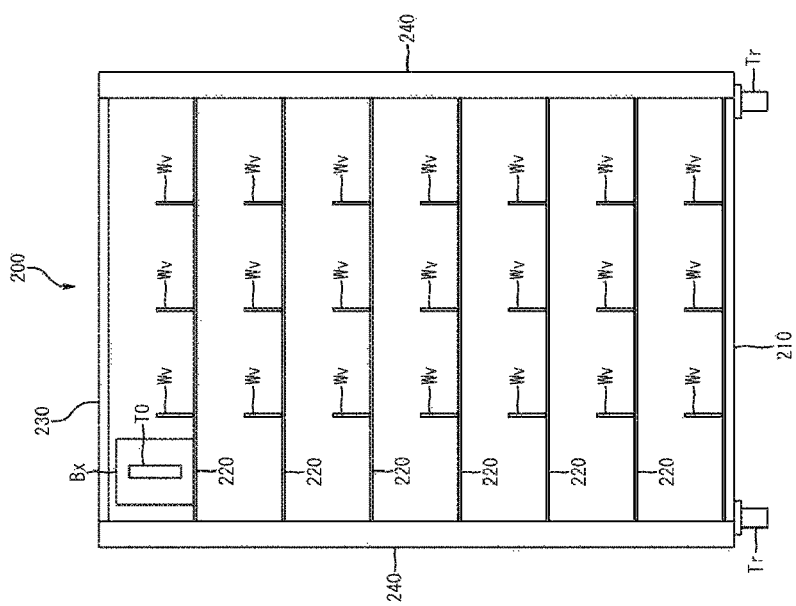

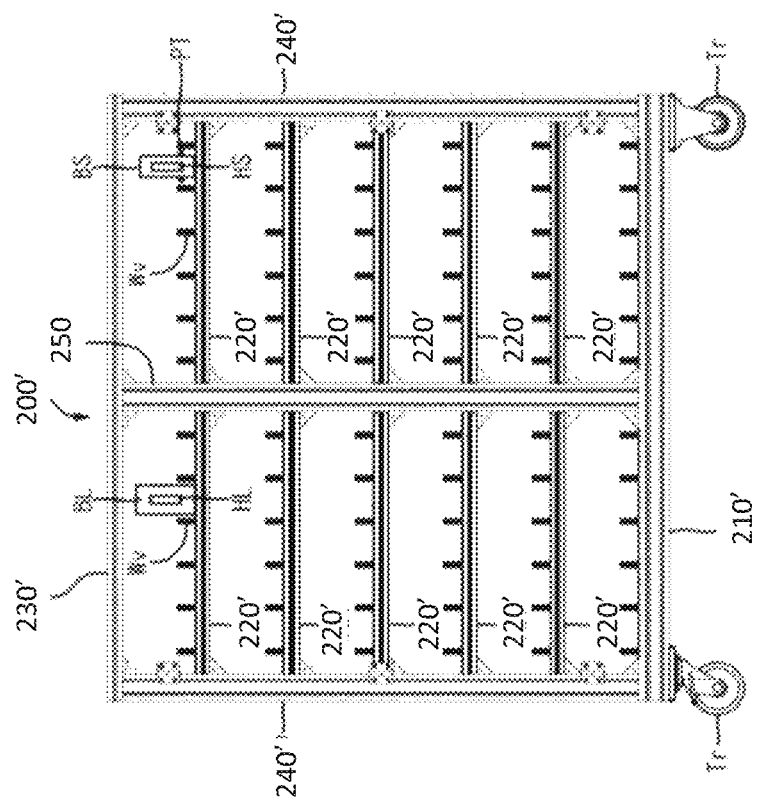

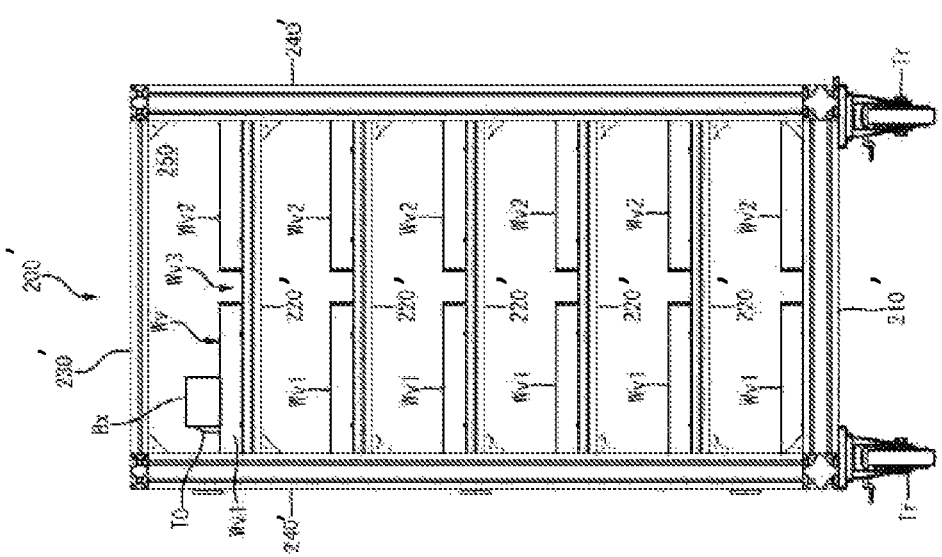

OBJECT CONVEYING ROBOT

CROSS-REFERENCE

This application claims priority to Japanese Patent Application Nos. JP2021-039180, JP2021-039181 and JP2021-039183 each filed Mar. 11, 2021 and each incorporated herein for all purposes.

FIELD

The present invention relates to an object conveying, handling, posturing and processing system. In one embodiment, the object is a bill storage container of the type used in casinos with slot and table games of chance.

BACKGROUND

Robots and robot-type systems are becoming more and more in demand. For example, automated systems for conveying a plurality of objects located on a shelf or the like to a predetermined position has been demanded.

For example, currently, bill storage containers are manually conveyed to installation locations by being transported via a movable shelf with wheels, and then manually placed at the entrance of a system. Since the bill storage containers, when full, usually weigh 3 to 4 kg, the work of unloading the bill storage containers from the movable shelf is relatively severe. Further, currently, the work of loading empty bill storage containers onto the above-mentioned movable shelf again is also performed manually, and this work is also relatively severe.

In another example, bill storage container unlocking system involve a conveyor which carries the bill storage container to a position proximate a robot arm (RA) having a key. The posture or orientation of the bill storage container is currently determined manually when the bill storage container is placed on the conveyor.

Thus, it would be advantageous to develop new automated systems for addressing the demands set forth above including handling and conveying objects (e.g., bill storage containers) and positioning them as needed.

SUMMARY

Object Conveying System

An object conveying robot according to a first embodiment of the present invention comprises a robot hand and a hand moving mechanism. The robot hand includes an articulated telescopic link mechanism and a grasping member. The articulated telescopic link mechanism is, for example, a lazy tongs type (a telescopic link mechanism for so-called magic hand) link mechanism capable of being telescopic by moving a plurality of nodes along a first virtual plane. The grasping member is attached to a distal end side of the articulated telescopic link mechanism. The hand moving mechanism, for example, a robot arm (RA) or the like, is connected to the robot hand. The robot hand assumes a posture in which the first virtual plane is parallel to the substantially vertical direction at least at the time of extension and contraction of the articulated telescopic link mechanism. Incidentally, the robot hand may be attached to the robot arm (RA) so that it always assumes such posture, or the robot hand may assume such posture only at the time of extension and contraction of the articulated telescopic link mechanism by controlling the hand moving mechanism using a control unit.

As described above, in this object conveying robot, the grasping member is attached to the distal end side of the articulated telescopic link mechanism in the robot hand. That is, in this robot hand, the grasping member is linearly moved by the articulated telescopic link mechanism and does not accompany up and down movement. For this reason, this object conveying robot is less likely to be limited in the dimensions of the shelves.

Further, in this object conveying robot, the robot hand assumes the posture in which the first virtual plane is parallel to the substantially vertical direction at least at the time of extension and contraction of the articulated telescopic link mechanism. For this reason, in this object conveying robot, the width dimension of the robot hand can be kept short at least at the time of extension and contraction of the articulated telescopic link mechanism. Therefore, in this object conveying robot, it is possible to facilitate automatic grasping of a plurality of objects stacked on a shelf.

The object conveying robot according to a second embodiment of the present invention is the object conveying robot according to the first embodiment, and the articulated telescopic link mechanism including a telescopic structure. The telescopic structure is composed of a plurality of nodes. The robot hand further includes a biasing member. The biasing member biases the telescopic structure of the articulated telescopic link mechanism to a base end side of the articulated telescopic link mechanism. For this reason, it is possible to easily return the articulated telescopic link mechanism from the extended state to the contracted state (initial state).

The object conveying robot according to a third embodiment of the present invention is the object conveying robot according to the second embodiment, and further comprising a detachable structure. The detachable structure allows the biasing member to be detached. For this reason, for example, when the biasing member is one that deteriorates with use (for example, a spiral spring or the like), the biasing member can be easily replaced.

The object conveying robot according to a fourth embodiment of the present invention is the object conveying robot according to any one of the first, second or third embodiments, and the articulated telescopic link mechanism including a first node, a second node, a first connecting pin, a first slider, a support portion, a third node, a second connecting pin, a second slider, and a drive source. The second node intersects a central portion of the first node at a central portion. The first connecting pin rotatably connects the first node and the second node around an intersection. The first slider is connected to a base end portion of the first node. Then, this first slider is slidable along a direction parallel to the first virtual plane and orthogonal to the telescopic direction. The support member rotatably supports a base end portion of the second node. The third node intersects a distal end portion of the first node at a base end portion. The second connecting pin rotatably connects the first node and the third node around an intersection. The second slider is connected to the second connecting pin. Then, this second slider is slidable along the telescopic direction. The drive source drives the second slider.

As described above, in this fourth embodiment of the object conveying robot, the first slider is connected to the base end portion of the first node, the second slider is connected to the second connecting pin, and the second slider is driven by the drive source. For this reason, in this object conveying robot, it is possible to increase the load of the drive source while the articulated telescopic link mechanism is extended, and to decrease the load of the drive source while the articulated telescopic link mechanism is contracted. That is, in this object conveying robot, objects can be more easily pulled out from shelves or the like as compared with the opposite case. In the opposite case, the load of the drive source is decreased while the articulated telescopic link mechanism is extended, and the load of the drive source is increased while the articulated telescopic link mechanism is contracted.

A fifth embodiment of the object conveying robot is the object conveying robot according to the fourth embodiment including a drive source driving the second slider via a ball screw. For this reason, the articulated telescopic link mechanism can be extended and contracted with a relatively simple structure.

An object conveying robot according to a sixth embodiment of the present invention is the object conveying robot according to the fourth of fifth embodiment, wherein the grasping member is a suction member and the drive source is an electric motor. This object conveying robot further comprises a control unit and a load detection unit. The control unit controls the operation of the robot hand while the load detection unit detects a load of the electric motor. When the load detected by the load detection unit exceeds a threshold value, the control unit contracts the articulated telescopic link mechanism. Therefore, the object can be pulled out from the shelf after the suction member is sufficiently pressed against the object.

The object conveying robot according to a seventh embodiment of the present invention is the object conveying robot according to any one of other embodiments wherein the robot hand further includes a support member. The support member supports the grasping member. A pair of distance sensors are attached to this support member forward. The pair of distance sensors is for measuring a distance in a direction parallel to the telescopic direction. Therefore, the robot hand can be directly opposed to the shelf, the object, or the like by utilizing the difference or the like in the detection distance of the pair of distance sensors.

The object conveying robot according to an eighth embodiment of the present invention is the object conveying robot according to any one of the other embodiments wherein the robot hand further includes a support member. The support member supports the grasping member. A pair of rollers whose rotation axis is parallel to the first virtual plane and is in a direction orthogonal to the telescopic direction are attached to this support member. Therefore, when a rail-shaped guide wall is formed on the shelf, the grasping member can be stably guided to the object by bringing the roller into contact with the guide wall.

The object conveying robot according to a ninth embodiment of the present invention is the object conveying robot according to any of the other embodiments wherein at least one of a distal end portion of the articulated telescopic link mechanism and the grasping member includes a pair of wheels whose rotation axis is in a direction orthogonal to the first virtual plane. For this reason, this object conveying robot can smoothly perform extension and contraction of the articulated telescopic link mechanism.

The object conveying robot according to a tenth embodiment of the present invention is the object conveying robot according to any of the other embodiments wherein the grasping member is a suction member for sucking a box body having a handle and wherein a plurality of the grasping members are disposed so as to sandwich the handle when facing the disposition surface of the handle of the box body. For this reason, it is possible to suction the box body in a state in which the suction member avoids the handle allowing a box body having the handle to be firmly suctioned.

Object Placing Shelf System

In a first embodiment, the object conveying robot system comprises a robot hand and an object placing shelf. Further, the robot hand is attached to a conveying device such as a robot arm (RA) and is made movable in a three-dimensional space by the conveying device. The robot hand includes a grasping member for grasping objects. The object placing shelf is for placing the object. The object is placed (accommodated) on the object placing shelf by a human hand or the robot hand or is pulled out or pushed out by the robot hand. The robot hand can move linearly with respect to the object placing shelf. As described above, the robot hand is configured to move linearly to pull out or push out the object from the object placing shelf or is configured to move linearly to store the object on the object placing shelf. The object placing shelf includes a shelf plate and a guide wall. The object is placed on the shelf plate while the guide wall guides the robot hand which is moving linearly. For this reason, by using the object conveying robot system, it is possible to automatically and smoothly perform the work of unloading the object located on the object placing shelf or the work of loading the object onto the shelf.

An object conveying robot system according to a second embodiment of the present invention comprises a push member and an object placing shelf. Further, the push member is attached to a conveying device, such as a robot arm (RA), and is made movable in a three-dimensional space by the conveying device. The push member pushes the object while the object placing shelf is receives the object. The push member moves linearly with respect to the object placing shelf. As described above, the push member is configured to move linearly to push the object from the object placing shelf or is configured to move linearly to store the object on the object placing shelf. The object placing shelf includes a shelf plate and a guide wall. The object is placed on the shelf plate while the guide wall guides the push member which moves linearly.

An object placing shelf according to a third embodiment of the present invention is for placing an object to be conveyed by a conveying device. The conveying device comprises a robot hand including a grasping member that moves linearly and a moving mechanism that moves the robot hand. The object placing shelf includes a shelf plate and guide walls. The guide walls extend upward from the upper surface of the shelf plate or extend downward from the lower surface of the shelf plate. Further, the guide walls are disposed so as to be parallel to each other.

The object placing shelf according to a fourth embodiment of the present invention is the object placing shelf according to the third embodiment wherein the object includes a protrusion extending in direction of its width. In one embodiment, the guide walls are disposed at intervals that do not contact the protrusion. For this reason, the object placing shelf allows the robot hand to smoothly load and unload the object even if when object includes a protrusion.

Posturing System

A conveying processing system according to a first embodiment of the present invention comprises a first conveying device, a second conveying device, and a processing device. The first conveying device includes a conveying mechanism and a posture control mechanism. The conveying mechanism conveys an object. The posture control mechanism controls a posture of the object. The first conveying device may change the posture of the object using the posture control mechanism and serves to convey the object from a first position to a second position. The second conveying device performs at least one operation of a conveying-in operation and a conveying-out operation. The conveying-in operation is an operation of conveying the object in a first posture to the first position of the first conveying device. The conveying-out operation is an operation of conveying the object in a second posture from the second position of the first conveying device. The processing device processes to the object which is changed into a third posture by the first conveying device. Then, when the conveying-in operation is performed by the second conveying device, the posture control mechanism performs a first posture control. In the first posture control, the posture of the object is changed from the first posture to the third posture. Further, when the conveying-out operation is performed by the second conveying device, the posture control mechanism performs a second posture control. In the second posture control, the object in the third posture is changed to the second posture.

With this conveying processing system, if the second conveying device performs the conveying-in operation, the object can be automatically placed on the first position of the first conveying device. Further, in this conveying processing system, the second conveying device can convey in the object in the first posture to the first position of the first conveying device, and the posture control mechanism of the first conveying device can change the object from the first posture to the third posture. That is, in this conveying processing system, the object can have a different posture when loaded and when processed.

Further, in this conveying processing system, if the second conveying device performs the conveying-out operation, the object can be conveyed from the second position of the first conveying device in the second posture. For this reason, in this conveying processing system, the object can be conveyed after processing of the object by the processing device in a posture different from a posture at the time of processing.

The conveying processing system according to a second embodiment of the present invention is the conveying processing system according to the first embodiment wherein the second conveying device includes a robot hand and a hand moving mechanism. The hand moving mechanism moves the robot hand. Further, the hand moving mechanism is fixed. The first position and the second position are within a range in which the robot hand can grasp the object. For this reason, in this conveying processing system, it is possible to convey the object to the first conveying device and to convey the object from the first conveying device by a single second conveying device.

The conveying processing system according to a third embodiment of the present invention is the conveying processing system according to the first embodiment wherein the second conveying device includes a robot hand and a hand moving mechanism. The hand moving mechanism moves the robot hand. This conveying processing system further includes a mechanism moving device. The mechanism moving device moves the hand moving mechanism between a position where the robot hand can grasp the object positioned in the first position and a position where the robot hand can grasp an object positioned in the second position. For this reason, in this conveying processing system, the first position and the second position of the first conveying device can be freely set, and it is possible to convey the object to the first conveying device and to convey the object from the first conveying device by a single second conveying device.

The conveying processing system according to a fourth embodiment of the present invention is the conveying processing system according to any one of the other embodiments wherein the object is a box body. The box body is placed on a shelf before being conveyed in by the first conveying device. Then, during the conveying-in operation, the box body located on the shelf is conveyed in a first posture to the first position of the first conveying device. Further, in the conveying-out operation, the box body is conveyed out in the second posture from the second position of the first conveying device to the shelf. For this reason, in this conveying processing system, if the second conveying device performs the conveying-in operation, it is possible to automatically convey the box body in the first posture to the first position of the first conveying device from the shelf, and if the second conveying device performs the conveying-out operation, it is possible to automatically convey the box in the second posture to the shelf from the second position of the first conveying device.

The conveying processing system according to a fifth embodiment of the present invention is the conveying processing system according to the fourth embodiment wherein the shelf includes a shelf plate and a guide wall. The guide wall extends in the vertical direction from a plate surface of the shelf plate. The shelf plate may extend upward or downward. Further, the robot hand includes a grasping member that moves linearly. The guide wall guides the grasping member. For this reason, in this conveying processing system, by placing the box body along the guide wall when placing the box body on the shelf, when conveying the box body to the first position of the first conveying device from the shelf, the grasping member can easily grasp the box body. Further, in this conveying processing system, when conveying the box body to the shelf from the second position of the first conveying device, the grasping member can easily place the box body on the shelf.

The conveying processing system according to a sixth embodiment of the present invention is the conveying processing system according to the fourth or fifth embodiment wherein the box body includes a lock on a front surface and a handle attached to a top surface. The first conveying device includes a first conveying mechanism, a first posture control mechanism, a second conveying mechanism, a second posture control mechanism, a third conveying mechanism, a third posture control mechanism and a fourth conveying mechanism. The first conveying mechanism includes the first position. The first posture control mechanism is disposed on a downstream side in a conveying direction of the first conveying mechanism. The second conveying mechanism is disposed on a downstream side in a conveying direction of the first posture control mechanism. The second posture control mechanism is disposed on a downstream side in a conveying direction of the second conveying mechanism. The third conveying mechanism is disposed on a downstream side in a conveying direction of the second posture control mechanism. The third posture control mechanism is disposed on a downstream side in a conveying direction of the third conveying mechanism. The fourth conveying mechanism is disposed on a downstream side in a conveying direction of the third posture control mechanism. Further, the fourth conveying mechanism includes the second position. In the first position, the box body is placed in a posture in which the top wall or bottom wall faces a conveying direction of the first conveying device. In the second position, the box body has a posture in which the top wall or the bottom wall faces the conveying direction of the first conveying device. The first posture control mechanism changes the box body to a posture in which the handle is positioned on the upper side. The second posture control mechanism rotates the box body along the horizontal plane to change the box body to a posture in which the front faces a specific direction. The third posture control mechanism changes the box body to a posture in which the top wall or the bottom wall faces the conveying direction of the first conveying device. In addition, the processing device unlocks the lock of the box body in the posture in which the front face faces the specific direction.

As described above, in this conveying processing system, the box body is placed in the posture in which the top wall or the bottom wall faces the conveying direction of the first conveying device in the first position of the first conveying device. Next, the box body assumes the posture in which the handle is positioned on the upper side by the first posture control mechanism. Next, when the posture of the box body is in the posture in which the front of the box body faces the specific direction, the box body is conveyed in the as-is posture, and the lock of the box body is unlocked by the processing device. On the other hand, when the posture of the box body is not in the posture in which the front of the box body faces the specific direction, the posture of the box body is changed to the posture in which the front faces the specific direction by the second posture control mechanism, and then the lock of the box body is unlocked by the processing device. Thereafter, the posture of the box body is changed to the posture in which the top wall or the bottom wall faces the conveying direction of the first conveying device by the third posture control mechanism. That is, when the conveying processing system is used, the box body can be placed on the shelf in the posture in which the top wall or the bottom wall faces outward when the box is transferred to the shelf by a person. That is, a worker can insert the box body into the shelf from both sides of the shelf while holding the handle of the box body and can place the box body on the shelf. For this reason, a worker collecting the box body can easily place the box body on the shelf. On the other hand, when returning the box body to the shelf from the second position, the box body can be placed by the robot hand on the shelf in the posture in which the top wall or the bottom wall faces outward. That is, the worker can easily grasp the handle of the box body when putting his/her hand from the side surface of the shelf. For this reason, when the box body is returned to the original location, the worker can easily return the box body to the original location.

The conveying processing system according to a seventh embodiment of the present invention is the conveying processing system according to the sixth embodiment wherein the first posture control mechanism and the third posture control mechanism are vertical rotation mechanisms. The vertical rotation mechanism grasps the box body and rotates the box body vertically. In this conveying processing system, the posture of the box body can be efficiently changed.

A vertical rotation device according to an eighth embodiment of the present invention comprises a placing table, a grasping member, a vertical rotation member, a vertical drive member and a control unit. An object located on the placing table can be grasped by the grasping member. The vertical rotation member rotates the grasping member vertically. The vertical drive member moves at least one of the placing table and the grasping member so that the placing table and the grasping member are separated in the vertical direction. Then, the control unit causes the grasping member to grasp the object located on the placing table. After that, the control unit separates the placing table and the grasping member in the vertical direction by the vertical drive member and then rotates the grasping member vertically by the vertical rotation member and places the object on the placing table again. In one embodiment, the rotation angle is 90°. For this reason, this vertical rotation device can efficiently change a posture of the object.

The vertical rotation device according to a ninth embodiment of the present invention is the vertical rotation device according to the eighth embodiment with a lifting member disposed on the placing table. The lifting member lifts the object for grasping by the grasping member.

Other variations, embodiments and features of the present invention will become evident from the following detailed description, drawings and claims.

BRIEF DESCRIPTION OF THE DRAWINGS

The disclosure will be readily understood by the following detailed description in conjunction with the accompanying drawings, wherein like reference numerals designate like structural elements.

FIG. 11 is a front view of a first exemplary movable shelf according to one embodiment of the present invention;

FIG. 12B is a front view of a second exemplary movable shelf with two different types of box bodies therein according to one embodiment of the present invention;

FIG. 13 is a right side view of the second exemplary movable shelf of a box body conveying system according to one embodiment of the present invention;

DETAILED DESCRIPTION

Figure 1:
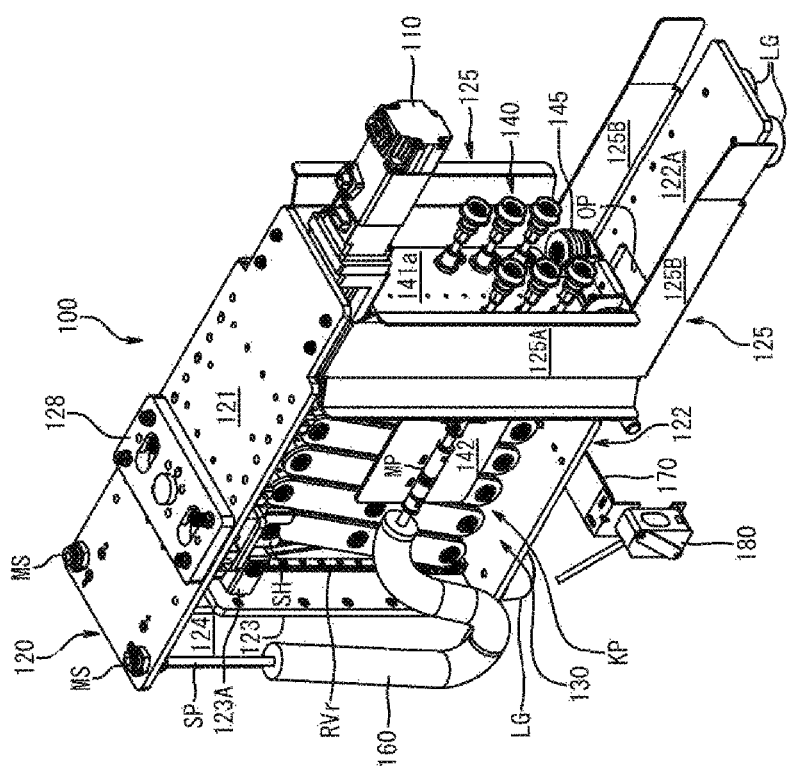
FIG. 1 is a perspective view of a robot hand from the left obliquely above the front side according to one embodiment of the present invention.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

The object conveying system according to an embodiment of the present invention broadly comprises a robot hand 100, a robot arm (RA) and a control device.

As shown in FIGS. 1 to 9, the robot hand 100 includes an electric motor 110, a frame 120, a link mechanism 130, a suction head unit 140, a detachable spiral spring unit 150, a flexible tube 160, a sensor mounting plate 170, and a distance sensor 180.

The electric motor 110 is a forward and reverse rotatable electric motor. The electric motor 110 is attached to a ball screw 115 so that its rotation axis coincides with the rotation axis of the ball screw 115. Thus, the ball screw 115 can switch the sliding direction of the horizontal slider (described below) (SH) by switching the rotation direction of the electric motor 110. In this embodiment, the load detection device (not shown) is connected to the electric motor 110 whereby the load of the electric motor 110 may be detected by the load detection device.

Figure 2:
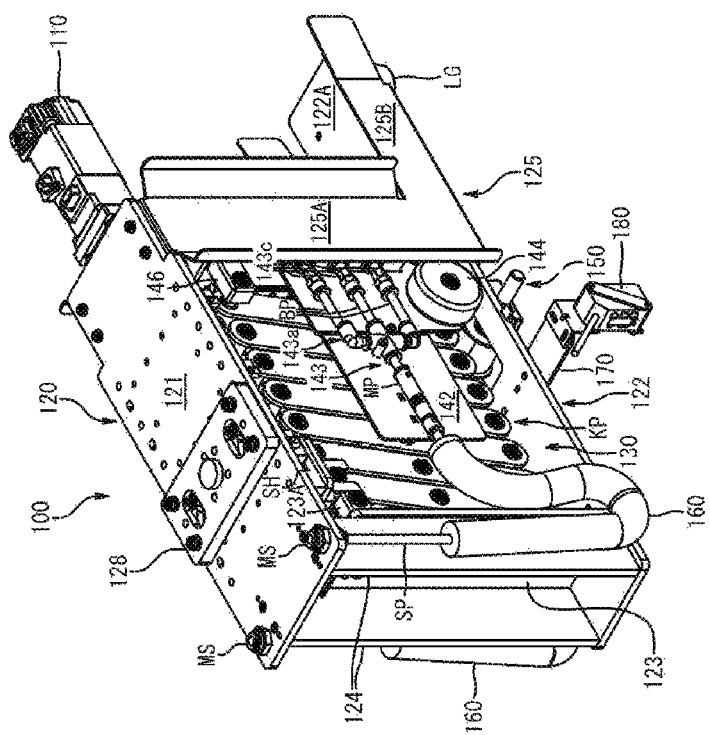
FIG. 2 is a perspective view of the robot hand from the right obliquely above the rear side according to one embodiment of the present invention.
Figure 3:
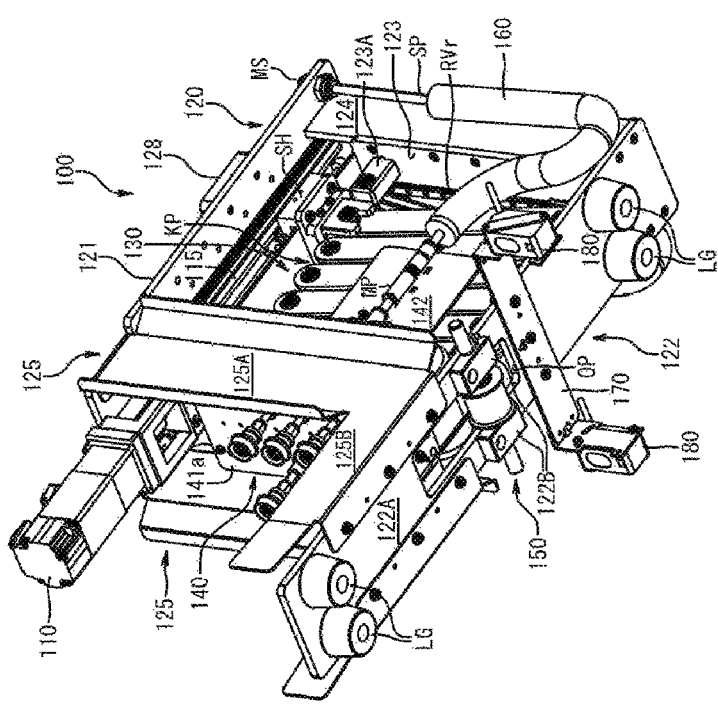
FIG. 3 is a perspective view of the robot hand from the right obliquely below the front side according to one embodiment of the present invention.
Figure 4:
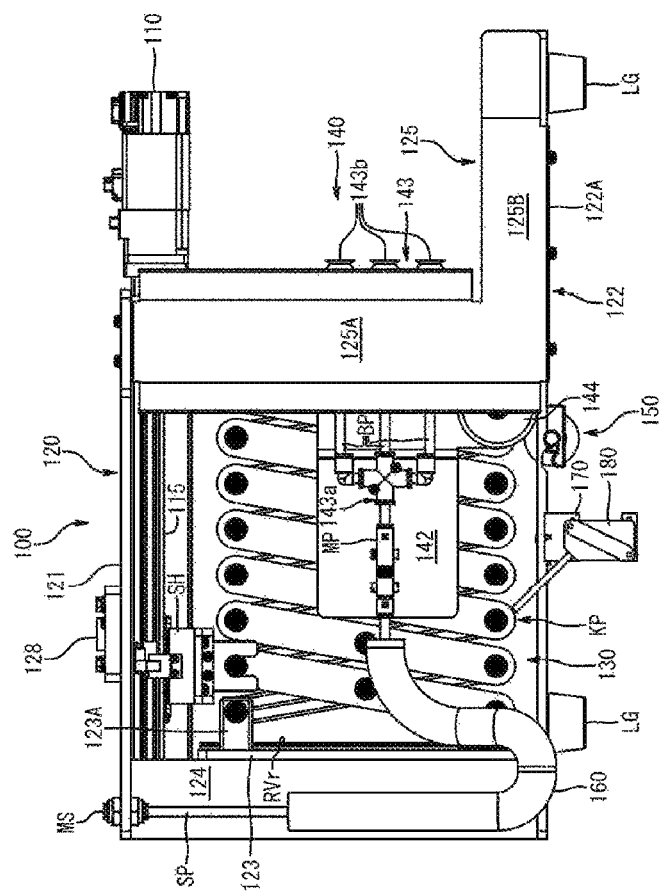
FIG. 4 is a left side view of the robot hand according to one embodiment of the present invention.

In one embodiment, the frame 120 includes a top plate 121, a bottom plate 122, a back plate 123, a rear side plate 124 and a front side L-shaped plate 125. The top plate 121 is a substantially rectangular plate member as shown in FIG. 1 and covers the upper side of the robot hand 100. As shown in FIGS. 1 to 4, on the lower side of the front portion of the top plate 121, the electric motor 110 is fixed so that the rotation axis extends toward the rear end. Further, as shown in FIGS. 1 and 2, a metal fitting 128 for mounting the robot arm (RA) is mounted slightly rearward of a central position measured along the longitudinal direction of the top plate 121. Further, as shown in FIGS. 3 and 4, the ball screw 115 is disposed on the back side (lower surface side) of the top plate 121.

The bottom plate 122 is a substantially rectangular plate member as shown in FIG. 3 and covers the lower side of the robot hand 100. The front side portion 122A of the bottom plate 122 (seen in FIGS. 1 and 3) functions as a placing table for the object. Further, as shown in FIG. 3, a rectangular opening (OP) is formed substantially at the center of this bottom plate 122. The opening (OP) is sized so that the detachable spiral spring unit 150 can be mounted. Further, as shown in FIG. 3, support claws 122B are provided on both side edges of the opening (OP). The support claw 122B is for detachably supporting a shaft 153 of the detachable spiral spring unit 150. Further, left and right pairs of legs (LG) are respectively attached to the front end portion and the rear end portion of the back side surface of the bottom plate 122 with the sensor mounting plate 170 attached to the back side surface of the slightly rear side of the opening (OP).

Figure 6:
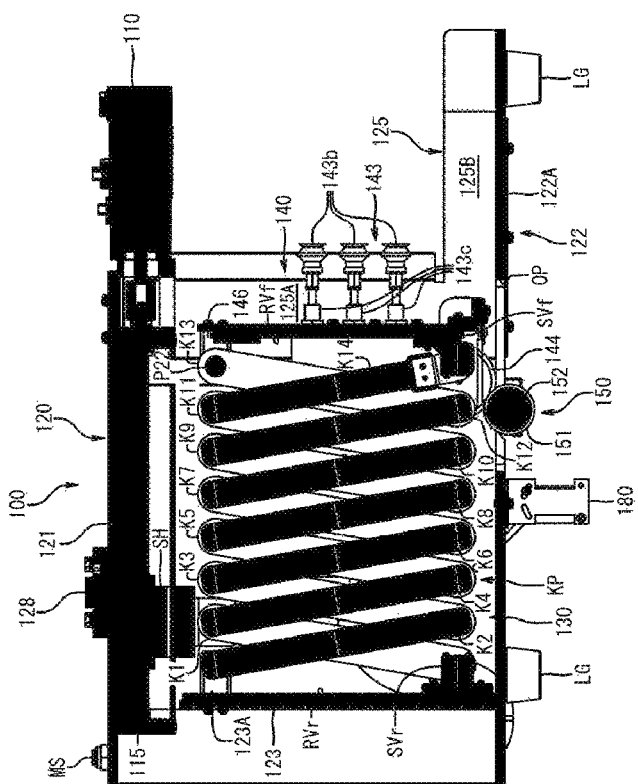
FIG. 6 is a cross-sectional view of the robot hand along I-I according to one embodiment of the present invention.
Figure 7:
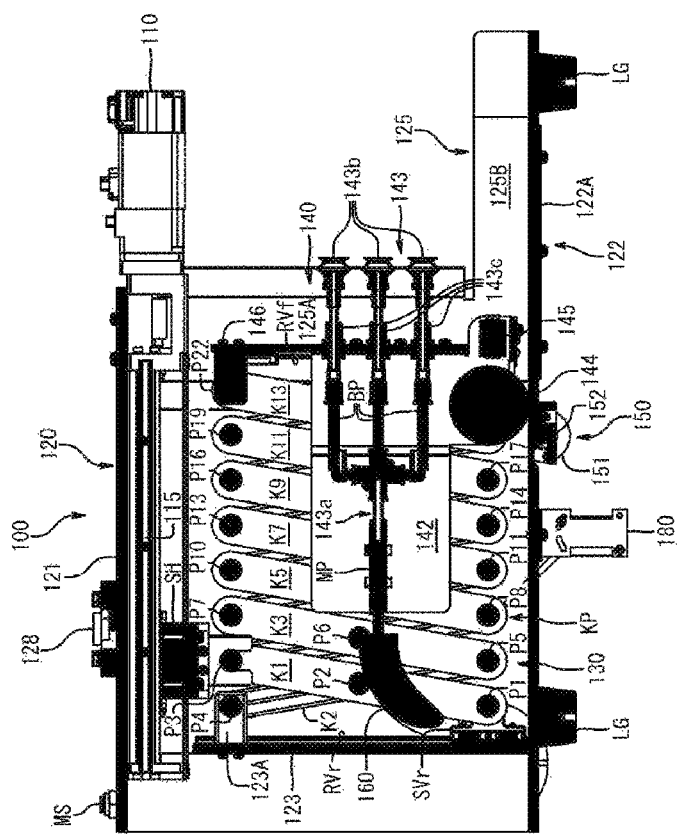
FIG. 7 is a cross-sectional view of the robot hand along II-II according to one embodiment of the present invention.

The back plate 123 is a substantially rectangular plate member as shown in FIGS. 1 and 4 and covers the back side of the robot hand 100. Further, rear vertical rail (RVr) and rear support protrusion portion 123A are formed on the front surface of the back plate 123. As shown in FIGS. 6 and 7, a rear vertical slider (SVr) is attached to the rear vertical rail (RVr) so that the rear vertical slider (SVr) can slide in the vertical direction. The rear support protrusion portion 123A is a protrusion portion extending forward from the front surface of the back plate 123. As described below, a second node (K2) is rotatably attached to the rear support protrusion portion 123A by a fourth link pin (P4) at the base end portion.

The rear side plate 124 functions as a prop for supporting the top plate 121 and the bottom plate 122 and, as shown in FIGS. 1 and 2, is provided on the rear side of the back plate 123 in pairs on the left and right.

A front side L-shaped plate 125 is a plate member having a substantially L-shape and covers the side surface of the front end portion of the robot hand 100. As shown in FIGS. 1 and 4, the front side L-shaped plate 125 is formed of a vertical sidewall portion 125A and a horizontal sidewall portion 125B. Similar to the rear side plate 124, the vertical sidewall portion 125A functions as a prop for supporting the top plate 121 and the bottom plate 122. On the other hand, as shown in FIG. 1, the horizontal sidewall portion 125B serves as a sidewall in the front side portion 122A of the base plate 122, and functions as a guide wall for guiding the suction head unit 140 forward. Specifically, the suction head unit 140 is guided forward, while the guide roller 145 of the suction head unit 140 contacts the inner surface of the horizontal sidewall portion 125B and rolls. Further, as shown in FIG. 1, the front portion of each of the horizontal sidewall portions 125B is slightly open towards their ends. This configuration makes it easier to receive the object which is pulled in by the suction head unit 140.

In one embodiment, the link mechanism 130 is a telescopic lazy tong type link mechanism. In this embodiment, as shown in FIGS. 6 to 9, the link mechanism 130 includes 14 nodes (links) K1 to K14, 23 link pins P1 to P23, a rear vertical slider (SVr) and a horizontal slider (SH).

The nodes (links) K1 to K14 are plate bar-shaped members, and the link pins P1 to P23 are members that axially support the base end portion, the central portion, and the distal end portion of nodes K1 to K14 to form the link mechanism 130. Hereinafter, a structure composed of only the nodes (links) K1 to K14 and the link pins P1 to P23 may be referred to as a telescopic structure. Further, the telescopic structure is denoted by the symbol (KP).

Figure 8:
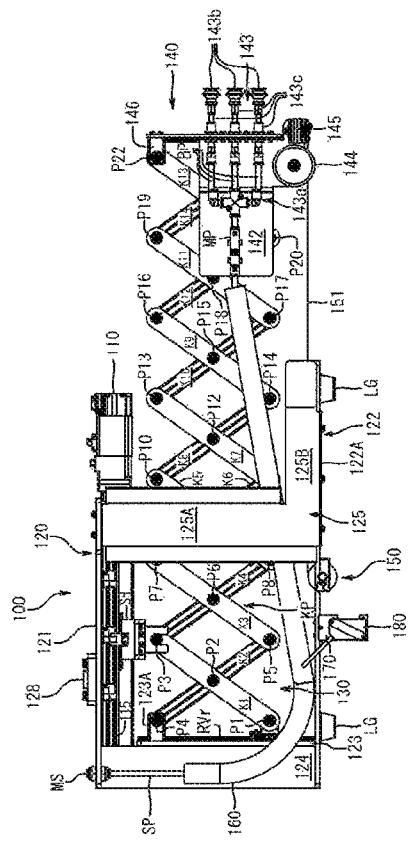
FIG. 8 is a left side view of the robot hand with the articulated telescopic link mechanism partially extended according to one embodiment of the present invention.
Figure 9:
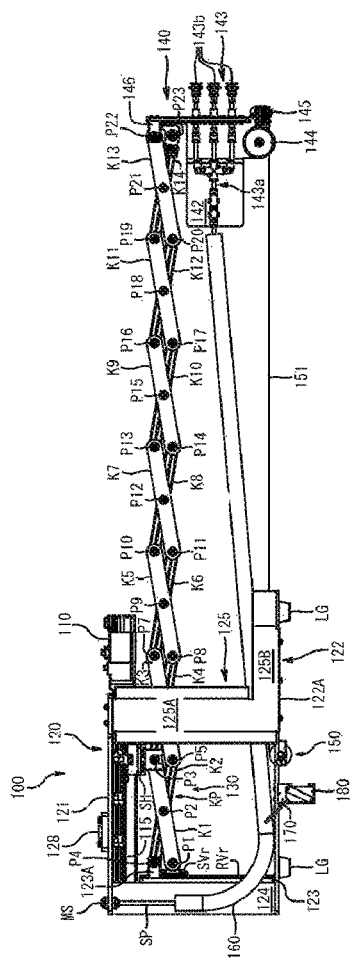
FIG. 9 is a left side view of the robot hand with the articulated telescopic link mechanism fully extended according to one embodiment of the present invention.

The first Node K1 is rotatably attached to the rear vertical slider (SVr) at the base end portion by the first link pin P1 (see FIGS. 6 to 9). Further, the first node K1 is rotatably attached to the central portion of the second node K2 at the central portion by the second link pin P2 and is rotatably attached to the base end portion of the fourth node K4 at the distal end portion by the third link pin P3. As shown in FIGS. 7 to 9, a horizontal slider (SH) is connected to the third link pin P3.

The second node K2 is rotatably attached to the rear support protrusion portion 123A at the base end portion by the fourth link pin P4 (see FIGS. 6 to 9). Further, the second node K2 is rotatably attached to the central portion of the first node K1 at the central portion by the second link pin P2 and is rotatably attached to the base end portion of the third node K3 at the distal end portion by the fifth link pin P.

The third node K3 is rotatably attached to the distal end portion of the second node K2 at the base end portion by the fifth link pin P5, rotatably attached to the central portion of the fourth node K4 at the central portion by the sixth link pin P6 and rotatably attached to the base end portion of the sixth node K6 at the distal end portion by the seventh link pin P7.

The fourth node K4 is rotatably attached to the distal end portion of the first node K1 at the base end portion by the third link pin P3, rotatably attached to the central portion of the third node K3 at the central portion by the sixth link pin P6 and rotatably attached to the base end portion of the fifth node K5 at the distal end portion by the eighth link pin P8.

The fifth node K5 is rotatably attached to the distal end portion of the fourth node K4 at the base end portion by the eighth link pin P8, rotatably attached to the central portion of the sixth node K6 at the central portion by the ninth link pin P9, and rotatably attached to the base end portion of the eighth node K8 at the distal end portion by the tenth link pin P10.

The sixth node K6 is rotatably attached to the distal end portion of the third node K3 at the base end portion by the seventh link pin P7, rotatably attached to the central portion of the node K5 at the central portion by the ninth link pin P9 and rotatably attached to the base end portion of the seventh node K7 at the distal end portion by the eleventh link pin P11.

The seventh node K7 is rotatably attached to the distal end portion of the sixth node K6 at the base end portion by the eleventh link pin P11, rotatably attached to the central portion of the eighth node K8 at the central portion by the twelfth link pin P12 and rotatably attached to the base end portion of the tenth node K10 at the distal end portion by the thirteenth link pin P13.

The eighth node K8 is rotatably attached to the distal end portion of the fifth node K5 at the base end portion by the tenth link pin P10, rotatably attached to the central portion of the seventh node K7 at the central portion by the twelfth link pin P12 and rotatably attached to the base end portion of the ninth node K9 at the distal end portion by the fourteenth link pin P14

The ninth node K9 is rotatably attached to the distal end portion of the eighth node K8 at the base end portion by the fourteenth link pin P14, rotatably attached to the central portion of the tenth node K10 at the central portion by the fifteenth link pin P15 and rotatably attached to the base end portion of the twelfth node K12 at the distal end portion by the sixteenth link pin P16.

The tenth node K10 is rotatably attached to the distal end portion of the seventh node K7 at the base end by the thirteenth link pin P13, rotatably attached to the central portion of the ninth node K9 at the central portion by the fifteenth link pin P15 and rotatably attached to the base end portion of the eleventh node K11 at the distal end portion by the seventeenth link pin P17.

The eleventh node K11 is rotatably attached to the distal end portion of the tenth node K10 at the base end portion by the seventeenth link pin P17, rotatably attached to the central portion of the twelfth node K12 at the central portion by the eighteenth link pin P18 and rotatably attached to the base end portion of the fourteenth node K14 at the distal end portion by the nineteenth link pin P19.

The twelfth node K12 is rotatably attached to the distal end portion of the ninth node K9 at the base end portion by the sixteenth link pin P16, rotatably attached to the central portion of the eleventh node K11 at the central portion by the eighteenth link pin P18 and rotatably attached to the base end portion of the thirteenth node K13 at the distal end portion by the twentieth link pin P20.

The thirteenth node K13 is rotatably attached to the distal end portion of the twelfth node K12 at the base end portion by the twentieth link pin P20 and rotatably attached to the central portion of the fourteenth node K14 at the central portion by the twenty-first link pin P21. Further, the thirteenth node K13 is rotatably attached to a front support protrusion portion 146 of the suction head unit 140 at the distal end portion by the twenty-second link pin P22.

The fourteenth node K14 is rotatably attached to the distal end portion of the eleventh node K11 at the base end portion by the nineteenth link pin P19 and rotatably attached to the central portion of the thirteenth node K13 at the central portion by the twenty-first link pin P21. Further, the fourteenth node K14 is rotatably attached to a front vertical slider (SVf) of the suction head unit 140 at the distal end portion by the twenty-third link pin P23.

Figure 5:
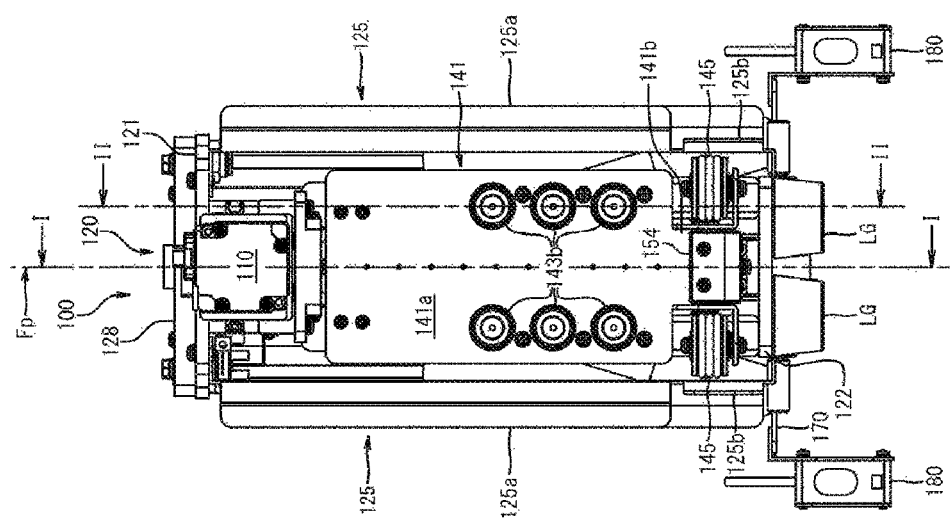
FIG. 5 is a front view of the robot hand according to one embodiment of the present invention.

In the telescopic structure (KP) configured as described above, the 14 nodes K1 to K14 move along the virtual vertical plane (Fp). As shown in FIG. 5, Fp is a plane overlapping with the I-I cross section.

As described above, the rear vertical slider (SVr) can slide the rear vertical rail (RVr) of the back plate 123 in the vertical direction. The rear vertical slider (SVr) rises with the advancement of the horizontal slider (SH) and falls with the retraction of the horizontal slider (SH).

The horizontal slider (SH) engages with the ball screw 115. The horizontal slider (SH) advances when the ball screw 115 rotates forward and retracts when the ball screw 115 is reversed. Further, the horizontal slider (SH) is connected to the third link pin P3. That is, the telescopic structure (KP) is extended and contracted by the forward and backward movement of the horizontal slider (SH).

The suction head unit 140 includes a front panel 141, a support plate 142, a suction pad unit 143, a wheel 144, a guide roller 145, a front vertical rail (RVf), a front vertical slider (SVf), and a front support protrusion portion 146.

As shown in FIG. 5, the front panel 141 is a plate member having an inverted convex shape including a main plate member 141a and a lower protrusion member 141b. The main plate member 141a is a plate member having a substantially rectangular shape. Three suction pads 143b are fixed to each of the left and right end portions of the lower portion of the main plate member 141a. The distance between the left and right suction pads 143b is a distance designed to sandwich a box body handle without overlapping the handle when being engaged by the left and rights suction pads. Further, the front support protrusion member 146 extends rearward from the upper portion of the back surface of the main plate member 141a and the support plate 142 extends rearward from both end portions in the width direction of the back surface of the main plate member 141a. The front vertical rail (RVf) is disposed along the vertical direction on the back surface of the main plate member 141a. The lower protrusion member 141b is a substantially square plate member extending downward from the center of the lower side of the main plate 141a. A fastening block 154 of the detachable spiral spring unit 150 is fastened (e.g., screwed) to the lower protrusion member 141b. In one embodiment, a detachable screw may be used.

The support plate 142 is a plate member for supporting a pipe unit 143a of the suction pad unit 143 and extends rearward from both end portions in the width direction of the back surface of the main plate member 141a of the front panel 141. A pair of wheels 144 are axially supported on the lower portion of the front side of this support plate 142.

As shown in FIGS. 1 and 2, the suction pad unit 143 includes a pipe unit 143a, a suction pad 143b and an elastic connecting pipe 143c. The pipe unit 143a includes one main pipe (MP) and three branch pipes (BP) with the main pipe (MP) communicating with all three branch pipes (BP). The main pipe (MP) is joined to the flexible tube 160 on the base end side, and the elastic connecting pipe 143c is joined to each branch pipe (BP). The suction pad 143b is joined to the distal end side of each elastic connecting pipe 143c. The elastic connecting pipe 143c is provided with an elastic portion such as a coil spring. The elastic portion biases the distal end portion of the elastic connecting pipe 143c forward. That is, the suction pad 143b is biased forward through the distal end portion of the elastic connecting pipe 143c. Therefore, when the suction pad 143b contacts the object and a load is applied to the suction pad 143b, the distal end portion of the elastic connecting pipe 143c and the suction pad 143b slightly retreat against the elastic force of the elastic portion, and when the load is not applied, the suction pad 143b returns to the original position by the elastic force of the elastic portion. The suction pad 143b is a telescopic member formed of a flexible material.

The wheel 144, as described above, is axially supported on the lower portion of the front side of the support plate 142. That is, the rotation axis of the wheel 144 follows a direction parallel to the width. The wheel 144 rolls over the top surface of the front side portion 122A of the bottom plate 122 of the frame 120, and rolls over the shelf plate of the shelf when it exceeds the front end portion of the front side portion 122A of the bottom plate 122 of the frame 120.

The guide roller 145 is a columnar rotator having a vertical direction as a rotation axis and guides the suction head unit 140 forward while rolling in contact with the inner surface of the horizontal sidewall portion 125B of the front side L-shaped plate 125. Further, when a guide wall perpendicular to the shelf plate of the shelf is provided, the guide roller 145 guides the suction head unit 140 forward while rolling in contact with an inner surface of the guide wall.

The front vertical rail (RVf) extends along the vertical direction on the back side surface of the front panel 141. A front vertical slider (SVf) is attached to the front vertical rail (RVf) so as to be freely slidable in the vertical direction.

As described above, the front vertical slider (SVf) can slide the front vertical rail (RVf) in the vertical direction. The front vertical slider (SVf) rises with the advancement of the horizontal slider (SH) and falls with the retraction of the horizontal slider (SH). Further, as described above, the fourteenth node K14 is rotatably attached to the front vertical slider (SVf) at the distal end portion by the twenty-third link pin P23.

The front support protrusion portion 146 is a protrusion portion extending rearward from the back side surface of the front panel 141. As described above, the thirteenth node K13 is rotatably attached to this front support protrusion portion 146 at the distal end portion by the twenty-second link pin P22.

Figure 10:
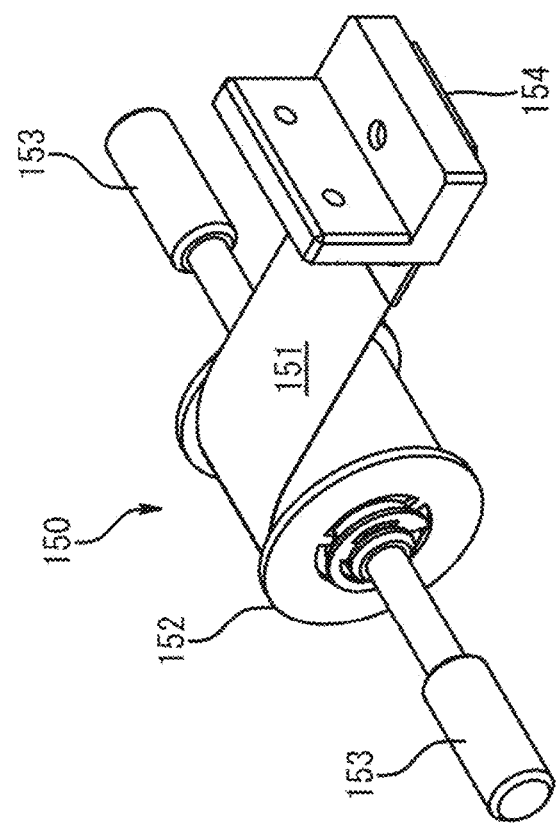
FIG. 10 is a perspective view of a detachable spiral spring unit according to one embodiment of the present invention.

As best shown in FIG. 10, the detachable spiral spring unit 150 includes a spiral spring 151, a holder 152, a shaft 153 and a fastening block 154. The spiral spring 151 is biased so as to be wound around the holder 152. That is, when the grip of a person releases the spiral spring 151 from extension, the spiral spring 151 winds around the holder 152 by its biasing force. The holder 152 is a cylindrical holding member (e.g., bobbin) for holding one end of the spiral spring 151. The shaft 153 extends along the axial direction of the holder 152 toward both directions of the holder 152. The shaft 153 is detachably supported by the support claw 122B shown in FIG. 3. The fastening block 154 is a member for fixing the other end of the spiral spring 151 to the lower protrusion portion 141b of the front panel 141 of the suction head unit 140. The fastening block 154 is fastened (e.g., screwed) to the lower protrusion portion 141b of the front panel 141 of the suction head unit 140.

The flexible tube 160 is joined to the outlet side of the original pipe (SP) and is joined to the base end side of the main pipe (MP) of the suction pad unit 143. A piping port (MS) is joined to the inlet of the original pipe (SP) and is provided at the rear end portion of the top plate 121 of the frame 120. Further, as shown in FIGS. 8 and 9, the flexible tube 160 has a sufficient length to correspond to the maximum extension state of the link mechanism 130.

The sensor mounting plate 170 is attached to the back side surface of the slightly rear side of the opening (OP) of the bottom plate 122 of the frame 120 and holds the distance sensor 180 at both end sides thereof.

The distance sensor 180 is a sensor for detecting a distance from an object located on the front side and is held on both end sides of the sensor mounting plate 170.

The robot arm is not particularly limited, but is, for example, an existing six-axis robot arm or the like.

The control device is communicatively connected to the robot hand 100 and the robot arm (RA), respectively. The control device transmits a control signal to the robot hand and the robot arm and receives various signals from the robot hand 100 and the robot arm (RA). The control device is communicatively connected to the electric motor 110 of the robot hand 100 and a decompression pump and controls the rotation direction of the electric motor 110 and the start-stop of the decompression pump.

Next, a control example of the object conveying system is described whereby the box body (Bx) to be placed on a movable shelf 200 (OR 200') is conveyed by the object conveying robot/system. The symbol (TO) indicates the handle.

Figure 12A:
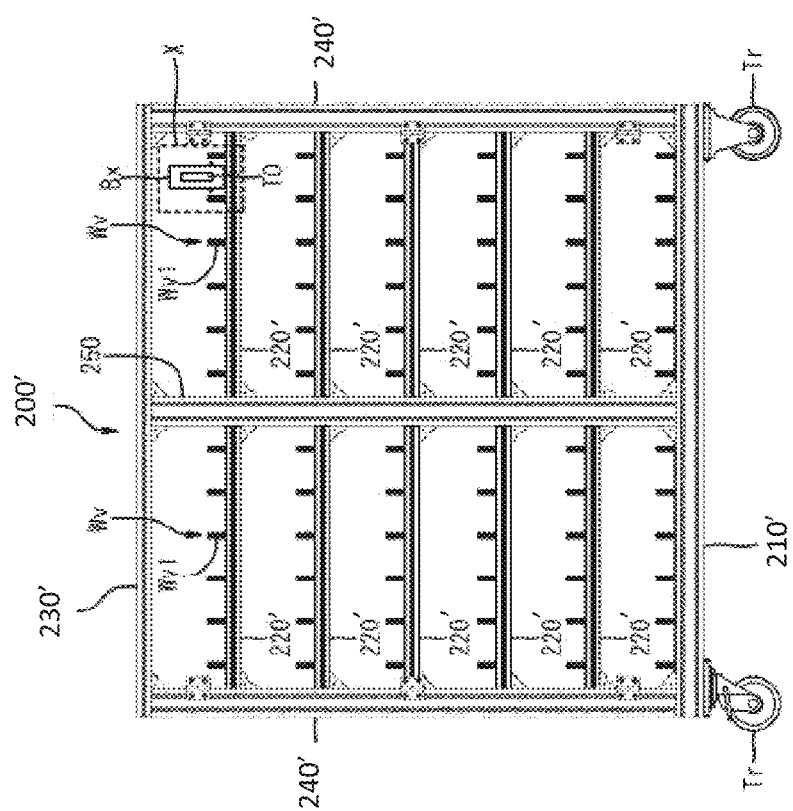
FIG. 12A is a front view of a second exemplary movable shelf with a single box body therein according to one embodiment of the present invention.

As shown in FIGS. 19-22, the box body (Bx) has a substantially rectangular parallelepiped shape, and is formed from a bottom wall, a top wall, a front wall, a back wall, a right side wall and a left side wall. The bottom wall and the top wall are rectangular plate members having the same dimensions. The front wall constitutes the front surface of the box body (Bx) connected thereto and extends from the front end of the bottom wall to the front end of the top wall. The back wall constitutes the back surface of the box body (Bx) and extends from the rear end of the bottom wall to the rear end of the top wall. The right side wall constitutes the right side surface of the box body (Bx) and extends from the right end of the bottom wall to the right end of the top wall. The left side wall constitutes the left side surface of the box body (Bx) and extends from the left end of the bottom wall to the left end of the top wall. A protrusion portion (Pr) extending outward from the right side wall and the left side wall is formed on the box body (Bx). As shown in FIGS. 11 to 13, the lower end of the protrusion portion (Pr) is positioned below the upper end of the guide plates (Wv) and (Wv') of the movable shelves 200 and 200'. In other words, at least a portion of the protrusion portion (Pr) is positioned so as to overlap the guide plate Wv and Wv'.

Before the description of the control examples, the first and second exemplary movable shelves 200 and 200' are briefly described. The movable shelf 200, as shown in FIG. 11, is formed with a bottom wall 210, a top wall 230, a sidewall 240, a shelf plate 220, a guide plate (Wv) and a wheel (Tr). The bottom wall 210 and the top wall 230 are a rectangular plate member having the same dimensions. The sidewall 240 is a pair of left and right and extends from the left and right ends of the bottom wall 210 to the left and right ends of the top wall 230. The shelf plate 220 is a rectangular plate member having substantially the same dimensions as the bottom wall 210 and the top wall 230. The shelf plate 220 divides a space between the bottom wall 210 and the top wall 230 into a plurality of spaces in the vertical direction. A plurality of guide plates (Wv) is attached to the bottom wall 210 and the shelf plate 220. The guide plate (Wv) is a substantially rectangular wall member extending upward along the vertical direction from the upper surface of the bottom wall 210 and the shelf plate 220 and is disposed along the depth direction.

A front wall and a back wall are not provided on the movable shelf 200 but they may be. Therefore, with the movable shelf 200, it is possible to place the box body (Bx) to the bottom wall 210 and the shelf plate 220 not only from the front side but also from the rear side. There are four wheels (Tr) with each wheel (Tr) attached to the four corners of the bottom wall 210.

The movable shelf 200', as shown in FIGS. 12 and 13, includes a bottom wall 210', a top wall 230', a prop 240', a partition wall 250, a shelf plate 220', a guide plate (Wv') and a wheel (Tr').

The bottom wall 210' and the top wall 230' are rectangular plate members having the same dimensions. The box body (Bx') can be placed on the bottom wall 210'. The prop 240' supports the top wall 230 and extends from the four corners of the upper surface of the bottom wall 210' to the four corners of the lower surface of the top wall 230'. The partition wall 250 divides a space defined by the bottom wall 210', top wall 230' and the prop 240' into two generally equally-sized sections.

The shelf plate 220' receives the box body (Bx'). The shelf plate 220' is a rectangular plate member having substantially the same depth as the bottom wall 210' and the top wall 230' and having width about half of the width of the bottom wall 210' and top wall 230'. As shown, the shelf plates 220' divide the space defined by the bottom wall 210, the top wall 230, the prop 240' and the partition wall 250 into twelve sections.

The guide plate (Wv') guides the suction head unit 140 of the robot hand 100 to the back and front of the movable shelf 200. Six guide plates (Wv') are respectively disposed in each of the twelve sections. Further, the guide plate (Wv') is formed of a front guide plate (Wv1) and a rear guide plate (Wv2). In one embodiment, the front guide plate (Wv1) is a substantially rectangular wall member extending upward from the front portion of the upper surface of the bottom wall 210 and the shelf plate 220 and disposed so that the adjacent front guide plate (Wv1) and the front guide plate (Wv1) are parallel to each other. As shown in FIG. 13, the rear guide plate (Wv2) is a substantially rectangular wall member extending from the rear portion of the upper surface of the bottom wall 210' and the shelf plate 220' and is disposed so that the adjacent rear guide plate (Wv2) and the rear guide plate (Wv2) are parallel to each other. As shown in FIG. 13, the front guide plate (Wv1) and the rear guide plate (Wv2) are spaced apart from each other by a predetermined distance so that a gap (Wv3) is formed between the front guide plate (Wv1) and the rear guide plate (Wv2).

Figure 14:
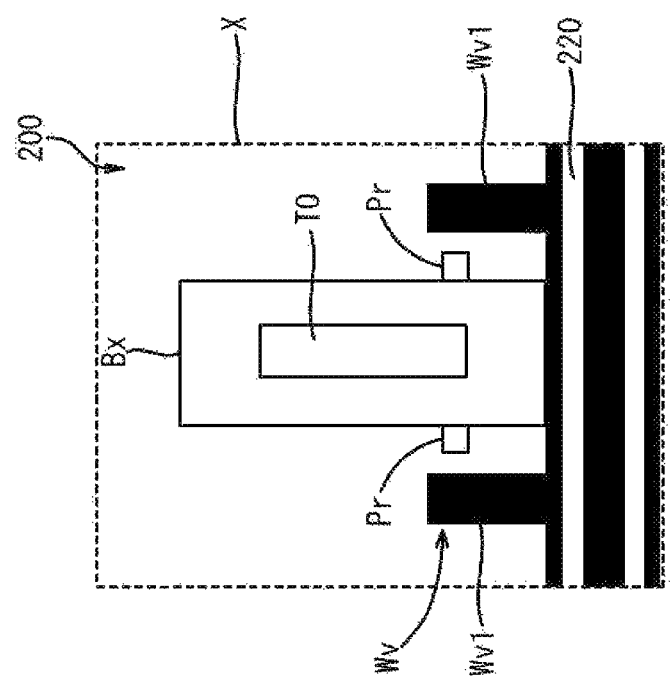
FIG. 14 is an enlarged view of enclosure portion X of FIG. 12 according to one embodiment of the present invention.

Further, as shown in FIGS. 11 and 13, the guide plates (Wv) are disposed at intervals preventing them from contacting a protrusion portion (Pr) integral with the box body (Bx). That is, a distance between adjacent guide plates Wv is larger than the width of the box body (Bx) and including the protrusion portion (Pr). For this reason, by using this box body conveying robot system, the robot hand 100 can smoothly load and unload the box body Bx even if the protrusion portion (Pr) is formed on the box body (Bx). FIG. 14 shows an enlarged view of a box body (Bx) in a space defined by the movable shelf 700.

The wheel (Tr') is a conventional caster or the like and is attached to the four corners of the lower surface of the bottom wall 210'.

The following is a general description of operation of the object conveying robot/system removing an object from the movable shelf 200 and placing it elsewhere. Initially, the user of the object conveying system/robot fixes the movable shelf 200 at a predetermined position and in a predetermined direction, and then operates the object conveying robot.

When the object conveying robot begins to operate, the robot hand 100 is lifted to a predetermined vertical position and is moved to the lateral direction position of the movable shelf 200 by the robot arm (RA). The posture of the robot hand 100 is controlled so that the front surface of the robot hand 100 is pointed towards the front surface of the movable shelf 200 and the configuration plane (Fp) of the telescopic structure (KP) is parallel to the vertical direction. At this time, a pair of distance sensors 180, provided in the robot hand 100, face the sidewall 240 and the guide plate (Wv) of the movable shelf 200 or face the adjacent guide plate (Wv) and the guide plate (Wv). Next, the posture of the robot hand 100 is controlled by the robot arm (RA) so that the difference in the detection distance of the pair of distance sensors 180 is within the allowable range (ideally as the difference in the detection distance is 0). Next, the electric motor 110 of the robot hand 100 begins to operate and the link mechanism 130 extends. Then, when the suction head unit 140 reaches the movable shelf 200, the guide roller 145 contacts the sidewall 240 and the guide plate (Wv) of the movable shelf 200, or the adjacent guide plates (Wv) to guide the suction head unit 140 to the back of the movable shelf 200. At this time, the wheel 144 rolls on the bottom wall 210 or shelf plate 220 of the movable shelf 200. Then, when the load of the electric motor 110, detected by the load detection device, exceeds the threshold value, the electric motor 110 is temporarily stopped, the decompression pump is operated, and the box body (Bx) is suctioned by the suction pad 143b. Thereafter, the electric motor 110 is operated in the reverse, and the link mechanism 130 is retracted to ultimately return to its initial state (i.e., contracted state). At this time, the box body (Bx) is placed on the front side portion 122A of the bottom plate 122 of the robot hand 100. In this state, the robot arm (RA) moves the robot hand 100 to the conveying destination. When the robot hand 100 reaches the conveying destination by the robot arm (RA), the electric motor 110 of the robot hand 100 starts to operate, the link mechanism 130 is extended, and the box body (Bx) is pushed out to the conveying destination by the suction head unit 140. All such operations of the robot arm (RA) and the robot hand 100 are realized by the control device which is communicatively connected to the robot arm (RA) and the robot hand 100.

The robot hand 100, according to the present embodiment, includes the suction head unit 140 attached to the distal end side of the link mechanism 130. That is, the suction head unit 140 is moved in a straight line by the link mechanism 130 and does not accompany vertical movement. For this reason, the object conveying robot is less likely to be limited by the dimensions of the shelves as compared with a conventional object conveying robot (i.e., those robots which perform an operation accompanied by vertical movement).

With the object conveying robot according to the present embodiment, the posture of the robot hand 100 is controlled so that the configuration plane (Fp) of the telescopic structure (KP) is parallel to the vertical direction at the time of extension and contraction of the link mechanism 130. For this reason, at the time of extension and contraction of the link mechanism 130, the width dimension of the robot hand 100 can be maintained short. Therefore, it is possible to facilitate automatic grasping of a plurality of objects stacked on a shelf.

With the robot hand 100 according to the present embodiment, the suction head unit 140 is biased toward the base end side by the spiral spring 151. For this reason, it is possible to easily return the suction head unit 140 from the extended state to the contracted state (i.e., initial state). When this biasing structure does not exist, only the upper side of the telescopic structure (KP) contracts completely, but the lower side of the telescopic structure (KP) may not contract completely.

In one embodiment, the robot hand 100 is provided with the detachable spiral spring unit 150 such that, when the elastic force of the spiral spring 151 has decreased due to use, the spiral spring 151 can be easily replaced.

With the robot hand 100, the rear vertical slider (SVr) is rotatably connected to the base end portion of the first node K1 by the first link pin P1, the front vertical slider (SVf) is rotatably connected to the distal end portion of the fourteenth node K14 by the twenty-third link pin P23, and the horizontal slider (SH) is further connected to the third link pin P3. For this reason, the load of the electric motor 110 can be increased when the link mechanism 130 is extended and the load of the electric motor 110 can be decreased when the link mechanism 130 is contracted. That is, the reverse case (when lowering the load of the electric motor 110 when extending the link mechanism 130 and increasing the load of the electric motor 110 when contracting the link mechanism 130) can be easily pulled out of the shelf.

With the robot hand 100, the electric motor 110 drives the horizontal slider (SH) via the ball screw 115. For this reason, the link mechanism 130 can be extended and contracted with a relatively simple structure.

With the robot hand 100, when the load detected by the load detection device exceeds the threshold value, the electric motor 110 is temporarily stopped and the decompression pump is operated to suction the object by the suction pad 143b, then by operating the motor 110 in reverse, the link mechanism 130 is contracted and finally returned to the initial state (i.e., contracted state). For this reason, after the suction pad 143b is sufficiently pressed against the object, the object can be suctioned and the object can be pulled out from the shelf.

The robot hand 100 is provided with a pair of distance sensors 180 whereby the robot hand 100 can face the movable shelf 200.

With the robot hand 100, the guide roller 145 is attached to the suction head unit 140. For this reason, when the movable shelf 200, as shown in FIG. 11, is used, the suction head unit 140 can be stably guided to the object by bringing the guide roller 145 into contact with the guide plate (Wv).

With the robot hand 100, the wheel 144 is attached to the suction head unit 140. For this reason, this robot hand 100 can smoothly extend and contract the link mechanism 130.

With the robot hand 100, when the handle (TO) of the box body (Bx) faces in the longitudinal direction, the distance between the left and right suction pads 143b is a distance designed to sandwich the handle (TO) without overlapping the handle (TO). For this reason, the box body (Bx) can be suctioned while the suction pad 143b avoids the handle (TO). Therefore, in this robot hand 100, the box body (Bx) can be firmly suctioned.

The box body conveying robot system according to one embodiment of the present invention is utilized to perform the work of unloading a box body (Bx) from the movable shelf 200' or the work of loading the box body (Bx) onto the movable shelf 200'. The box body conveying robot system broadly comprises a robot hand 100, a robot arm (RA), a control device and a movable shelf 200.

The following is a general description of operation of the object conveying robot/system removing an object from the movable shelf 200'. First, the user of the box body conveying robot system fixes the movable shelf 200' at a predetermined position and in a predetermined direction, and then operates the robot hand 100, the robot arm (RA) and the control device. When the robot hand 100, the robot arm RA and the control device begin to operate and while the robot hand 100 waiting at its initial position is lifted to a predetermined height and is moved laterally by the robot arm (RA), the posture of the robot hand 100 is controlled so that the front surface of the robot hand 100 points in the direction of front surface of the movable shelf 200' and the configuration plane (Fp) of the telescopic structure (KP) is vertical. At this time, a pair of distance sensors 180 provided in the robot hand 100 face adjacent guide plates (Wv'), adjacent front guide plates (Wv1) or the adjacent rear guide plates (Wv2). Next, the posture of the robot hand 100 is controlled by the robot arm (RA) so that the difference in the detection distance of the pair of distance sensors 180 is within the allowable range (e.g., where the difference in the detection distance is 0). The robot hand 100 now substantially points in the direction of the adjacent guide plates (Wv'). Next, the electric motor 110 of the robot hand 100 begins to operate and the link mechanism 130 extends. Then, when the suction head unit 140 reaches the movable shelf 200' and while the guide roller 145 is in contact with the adjacent guide plates (Wv), the guide roller 145 guides the suction head unit 140 into the depth of the movable shelf 200' to the back of the movable shelf 200'. At this time, the wheel 144 rolls on the bottom wall 210' or shelf plate 220' of the movable shelf 200'. Then, when the load of the electric motor 110 detected by the load detection device exceeds the threshold value, the electric motor 110 is temporarily stopped, the decompression pump is operated, and the box body (Bx) is suctioned by the suction pad 143b. Thereafter, when the electric motor 110 is operated in the reverse and the link mechanism 130 is retracted and while the guide roller 145 is in contact with the adjacent guide plates (Wv'), the guide roller 145 guides the suction head unit 140 out of the movable shelf 200' to the front of the movable shelf 200'. Finally, the robot hand 100 is returned to the initial state (contracted state). At this time, the box body (Bx) is located on the front side portion 122A of the bottom plate 122 of the robot hand 100 (i.e., the box body Bx is pulled out from the movable shelf 200'). In this state, the robot arm (RA) moves the robot hand 100 to the conveying destination (e.g., the start position of the belt conveyor). When the robot hand 100 reaches the conveying destination by the robot arm (RA), the electric motor 110 of the robot hand 100 starts to operate, the link mechanism 130 is extended, and the box body (Bx) is pushed out to the conveying destination by the suction head unit 140.

The following is a general description of operation of the object conveying robot/system removing an object from the movable shelf 200'. The following is a general description of operation of the object conveying robot/system placing an object onto the movable shelf 200'. First, the user of the box body conveying robot system fixes the movable shelf 200' at a predetermined position and in a predetermined direction, and then operates the robot hand 100, the robot arm (RA) and the control device. When the robot hand 100, the robot arm (RA) and the control device begin to operate, the robot hand 100, waiting at the initial position, is moved by the robot arm (RA) to the box body receiving destination (e.g., the end position of the belt conveyor) where the body box (Bx) is located. More particularly, the robot hand 100 is moved by the robot arm (RA) such that the front surface of the robot hand 100 points in the direction of the front wall of the box body (Bx) which is located on the box body receiving destination. When the robot hand 100 reaches the box body receiving destination by the robot arm (RA), the electric motor 110 of the robot hand 100 begins to operate, and the link mechanism 130 extends. Then, when the suction head unit 140 reaches the front wall of the box body (Bx), the electric motor 110 is temporarily stopped, the decompression pump is operated, and the box body (Bx) is suctioned by the suction pad 143b. Thereafter, the electric motor 110 is operated in reverse, and the link mechanism 130 is retracted to return to initial state (i.e., contracted state). At this time, the box body (Bx) is on the front side portion 122A of the bottom plate 122 of the robot hand 100. In this state, the robot arm (RA) moves the robot hand 100 to the movable shelf 200'. Then, while the robot hand 100 is lifted to a predetermined height and is moved laterally by the robot arm (RA), the posture of the robot hand 100 is controlled so that the front surface of the robot hand 100 points in the direction of the front surface of the movable shelf 200' and the configuration plane (Fp) of the telescopic structure (KP) is vertical. At this time, a pair of distance sensors 180 provided in the robot hand 100 face the adjacent guide plates (Wv), adjacent front guide plates (Wv1) or adjacent rear guide plates (Wv2). Next, the posture of the robot hand 100 is controlled by the robot arm (RA) so that the difference in the detection distance of the pair of distance sensors 180 is within the allowable range (e.g., the difference in the detection distance is 0). Next, the electric motor 110 of the robot hand 100 begins to operate and the link mechanism 130 extends. Then, when the suction head unit 140 and the box body (Bx) reach the movable shelf 200' and while the guide roller 145 is in contact with the adjacent guide plates (Wv), the guide roller 145 guides the suction head unit 140 and the box body (Bx) along into the back of the movable shelf 200'. At this time, the wheel 144 rolls on the bottom wall 210' or shelf plate 220' of the movable shelf 200'. Then, when the load of the electric motor 110 detected by the load detection device exceeds the threshold value, the electric motor 110 is temporarily stopped, the decompression pump is stopped and the box body (Bx) is released from the suction pad 143b. As a result, the box body (Bx) can be stored in the movable shelf 200'. Thereafter, when the electric motor 110 is operated in the reverse and the link mechanism 130 is retracted, while the guide roller 145 is in contact with the adjacent guide plates (Wv), the guide roller 145 guides the suction head unit 140 out of the front of the movable shelf 200'. Finally, the robot hand 100 is returned to the initial state (i.e., contracted state), and is moved to the initial position by the robot arm (RA).

By using this box body conveying robot system, the work of unloading the box body (Bx) placed on the movable shelf 200' or the work of loading the box body (Bx) on the movable shelf 200' can be performed automatically and smoothly.

Modifications

With the object conveying robot, the robot hand 100 is connected to the robot arm (RA), but the robot hand 100 may also be connected to a frame type moving mechanism. Further, the robot hand 100 may be attached so that the configuration plane (Fp) of the telescopic structure (KP) is always parallel to the vertical direction.

With the robot hand 100, the electric motor 110 is employed as the drive source and the mechanism comprising the ball screw 115 and the horizontal slider (SH) is employed as the mechanism for realizing extension and contraction of the telescopic structure (KP). However, (i) an air cylinder, a hydraulic cylinder, or the like may be employed as the drive source and the telescopic mechanism, (ii) an electric motor may be employed as the drive source, and a rack-and-pinion mechanism may be employed as the mechanism for realizing extension and contraction of the telescopic structure (KP), (iii) an electric motor may be employed as the drive source, and a zip chain actuator manufactured by Tsubakimoto Chain Corporation may be employed as the mechanism for realizing extension and contraction of the telescopic structure (KP) and (iv) an electric motor may be employed as the drive source, and a ROLLBEAM manufactured by SERAPID Corporation may be employed as the mechanism for realizing extension and contraction of the telescopic structure (KP).

With the robot hand 100, the detachable spiral spring unit 150 is provided for the purpose of returning the fully extended telescopic structure (KP) to the initial contracted state. However, as another means for achieving this purpose, (i) a coil spring may be employed or (ii) a mechanism including an electric motor, a wire, a clutch, and the like may be employed. In such an embodiment, the wire is unwound when the telescopic structure (KP) is extended, the wire is wound by an electric motor when the telescopic structure (KP) is contracted.

With the robot hand 100, the suction pad unit 143 is employed as the grasping means of the object, but a hand unit with fingers such as a two-finger hand or a five-finger hand, a chuck unit, or the like may be employed instead.

With the robot hand 100, the electric motor 110, the front support protrusion member 146 and the rear support protrusion member 123A has been disposed on the upper side. However, the electric motor 110, the front support protrusion member 146 and the rear support protrusion member 123A may be disposed on the lower side (e.g., the lower side of the bottom plate 122). In such an embodiment, the initial positions (i.e., positions when in the contracted state) of the front vertical slider (SVf) and the rear vertical slider (SVr) are the upper end positions of the front vertical rail (RVf) and the rear vertical rail (RVr). The front vertical slider (SVf) and the rear vertical slider (SVr) fall as the horizontal slider (SH) advances and rise as the horizontal slider (SH) retreats.

In the movable shelf 200' of the box body conveying robot system according to one embodiment described above, the partition wall 250 divides the space defined by the bottom wall 210', the top wall 230' and the prop 240' into two equally-sized sections. However, the movable shelf 200' may also not include the partition wall 250. In such a case, the defined space is not divided into two sections. Alternatively, two or more partition walls 250 may be provided. In such a case, the defined space is divided into three or more sections. Moreover, the sections need not be equally sized.

In the movable shelf 200' of the box body conveying robot system according to the above embodiment, five shelf plates 220' are disposed in the defined spaces. However, the number of shelf plates 220' disposed in the defined spaces may be appropriately adjusted according to the height of the box body (Bx).

In the movable shelf 200' of the box body conveying robot system according to the above embodiment, the guide plate (Wv') extends upward from the upper surface of the bottom wall 210' and the shelf plate 220'. However, the guide plate (Wv') may extend downward from the lower surface of the top wall 230' and the shelf plate 220'. In such a case, it is beneficial that the upper end of the protrusion portion (Pr) of the box body (Bx) be positioned above the lower end of the guide plate (Wv').

In the movable shelf 200' of the box body conveying robot system according to the above embodiment, the guide plate (Wv') is formed of the front guide plate (Wv1) and the rear guide plate (Wv2) whereby the front guide plate (Wv1) and the rear guide plate (Wv2) are spaced apart from each other by a predetermined distance so that the gap (Wv3) is formed between the front guide plate (Wv1) and the rear guide plate (Wv2). However, the gap (Wv3) may not be formed between the front guide plate (Wv1) and the rear guide plate (Wv2). That is, the front guide plate (Wv1) and the rear guide plate (Wv2) may be connected to each other.

In the box body (Bx) located on the movable shelf 200' of the box body conveying robot system according to the above embodiment, the protrusion portion (Pr) extends outward from the right side wall and the left side wall. However, the protrusion portion (Pr) may extend outward from either one of the right side wall or the left side wall.

In the movable shelf 200' of the box body conveying robot system according to the above embodiment, six guide plates (Wv') are respectively disposed in twelve spaces defined by the bottom wall 210', the top wall 230', the prop 240', the partition wall 250 and the shelf plate 220'. However, the number of guide plates (Wv') disposed in the defined spaces may be appropriately adjusted according to the width, including the protrusion portion (Pr), of the box body (Bx).

In the box body conveying robot system according to the above embodiment, the box body (Bx) located on the bottom wall 210' or the shelf plate 220' of the movable shelf 200' is suctioned by the suction pad 143b of the robot hand 100 and pulled out from the movable shelf 200'. However, the box body (Bx) may be pushed out of the movable shelf 200' via a pushing member 400 best seen in FIGS. 15 and 16.

Figure 15:
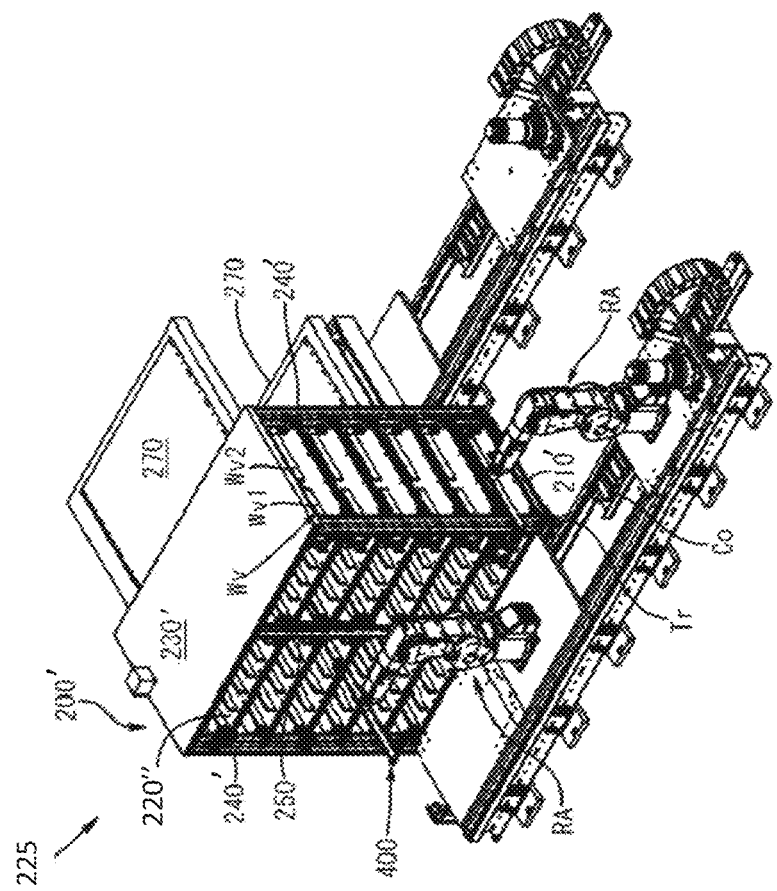
FIG. 15 is an image diagram showing an overall configuration of a box body conveying system according to one embodiment of the present invention including a push member.
Figure 16:
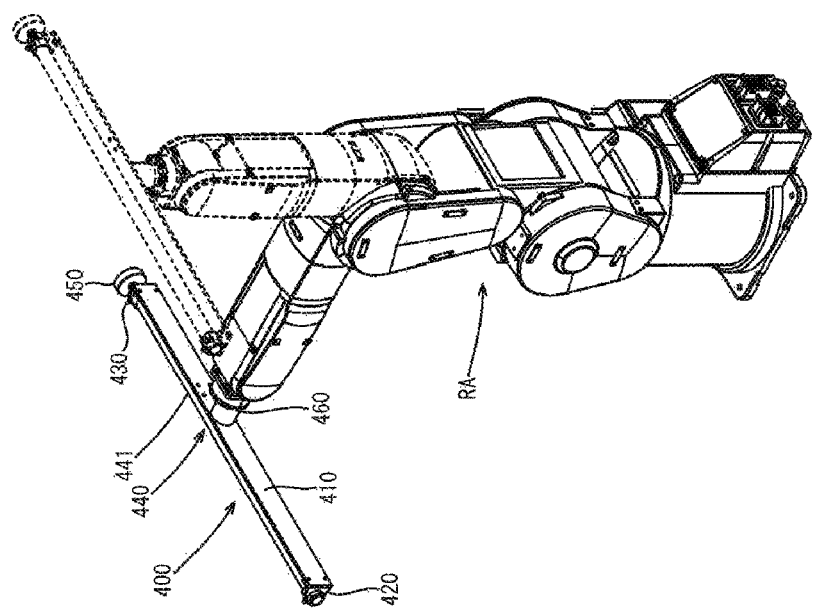
FIG. 16 is a perspective view of a robot arm and extruding member of the box body conveying system including the push member according to one embodiment of the present invention.

FIGS. 15 and 16 show another embodiment of the box body conveying robot system 225. As shown in FIG. 15, a box body receiving plate 270 is disposed on a rear side of the shelf plate 220" of the movable shelf 200' (or the front side of the shelf plate 220" of the movable shelf 200' when the box body (Bx) is pushed (rather than pulled) out to the front side of the movable shelf 200'. This box body receiving plate 270 is for receiving the box body (Bx) when pushed out from the movable shelf 200' and is attached to the movable shelf 200' or placed on a lift (not shown) or the like. In this embodiment, the push member 400, rather than the robot hand 100, is connected to the distal end of the robot arm (RA). The push member 400 includes a main body wall 410, a front vertical wall 420, a rear vertical wall 430, a cylinder mechanism 440, a box body contact member 450, a connecting member 460 and a distance sensor (not shown).

The main body wall 410 is a substantially rectangular plate member whereas the front vertical wall 420 is a substantially trapezoidal plate member extending from the front end of the main body wall 410 so as to be perpendicular to the main body wall 410. The rear vertical wall 430 is a substantially trapezoidal plate member extending in the same direction as the front vertical wall 420 from the rear end of the main body wall 410 so as to be perpendicular to the main body wall 410. A rod insertion hole (not shown) is formed in the rear vertical wall 430. The cylinder mechanism 440 is configured to move the box body contact member 450 into the movable shelf 200'. The cylinder mechanism 440 may be an air cylinder mechanism, a hydraulic cylinder mechanism, and the like. The cylinder mechanism 440 extends along the longitudinal direction of the main body wall 410 and includes a rod cover member 441 and a rod (not shown). The rod cover member 441 is for accommodating the rod. Further, the rod cover member 441 is disposed between the front vertical wall 420 and the rear vertical wall 430, one end portion of the rod cover portion 441 is attached to the front vertical wall 420, the other end portion of the rod cover member 441 is attached to the rear vertical wall 430. The rod is accommodated in the rod cover member 441 through the rod insertion hole of the rear vertical wall 430. Within the extent that at least a portion of the rod is accommodated in the rod cover member 441, the rod is movable along the longitudinal direction of the rod cover member 441 (i.e., along the depth of the movable shelf 200'). The cylinder mechanism 440 is communicatively connected to the control device, and the movement of the rod is controlled by the control device. The box body contact member 450 is configured to push the box body (Bx) out from the movable shelf 200'. The box body contact member 450 has a substantially cylindrical shape and attaches to the end portion of the rod of the cylinder mechanism 440. That is, when the rod moves along the depth of the movable shelf 200', the box body contact member 450 also moves along the depth of the movable shelf 200'. The box body contact member 450 may take on other shapes and is not limited to a substantially cylindrical shape.

The connecting member 460 is a portion for connecting the push member 400 to the robot arm (RA), and is, for example, a flange or the like. The distance sensor (not shown) is a sensor for detecting the distance between the object positioned on the front side, and is, for example, held on both end sides of the main body wall 410. Ideally, the guide roller 145 of the robot hand 100 according to the above embodiment is attached to at least one of the main body wall 410 and the box body contract member 450 of the push member 400.

In practice, the user of the box body conveying robot system fixes the movable shelf 200' at a predetermined position and in a predetermined direction, and then operates the box body conveying robot system. When the box body conveying robot system begins to operate, the push member 400 is lifted to a predetermined height and moved to lateral position relative to the movable shelf 200' by the robot arm (RA). The posture of the push member 400 is controlled so that the box body contract member 450 is directed at the front surface of the movable shelf 200'. The robot arm (RA) is movable along the width of the movable shelf 200' by the belt conveyor (Co) and is able to pivot the push member 400 around the axis (see FIG. 16). When the posture of the push member 400 is controlled, the distance sensor of the push member 400 is directed at the adjacent front guide plates (Wv1) of the movable shelf 200' or the adjacent rear guide plates (Wv2) of the movable shelf 200' when the box body (Bx) is to be pushed out to the front side of the movable shelf 200'. Next, the posture of the push member 400 is controlled by the robot arm (RA) so that the difference in the detection distance of the distance sensor is within the allowable range (i.e., difference in the detection distance is 0). Next, the cylinder mechanism 440 of the push member 400 begins to operate with the rod and the box body contact member 450 reaching the movable shelf 200' and moving to the back of the movable shelf 200'. As a result, after the box body contact member 450 contacts with the box body (Bx) located on the bottom wall 210' or the shelf plate 220' of the movable shelf 200', it is possible to push the box body (Bx) to the rear side of the movable shelf 200'. Then, the box body receiving plate 270 receives the box body (Bx) as it is pushed out from the movable shelf 200'. Thereafter, the cylinder mechanism 440 of the push member 400 begins to operate, the rod and the box body contact member 450 moves to the front of the movable shelf 200'. Finally, the push member 400 is returned to its initial state (see FIG. 16).

Those skilled in the art will recognize that each of the above modifications may be applied alone or in combination.

Figure 17:
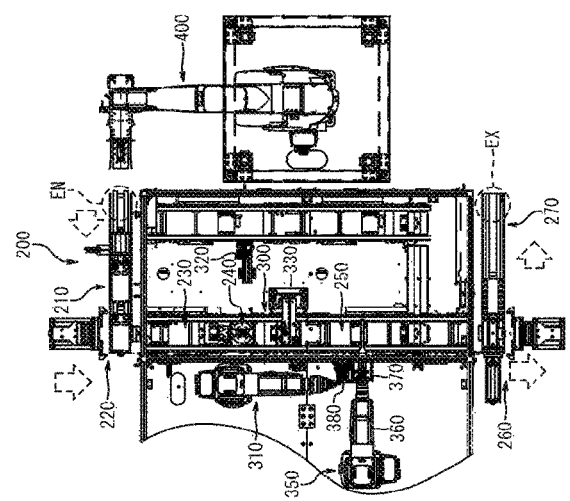
FIG. 17 is a schematic diagram showing an overall configuration of a conveying processing system according to one embodiment of the present invention.
Figure 18:
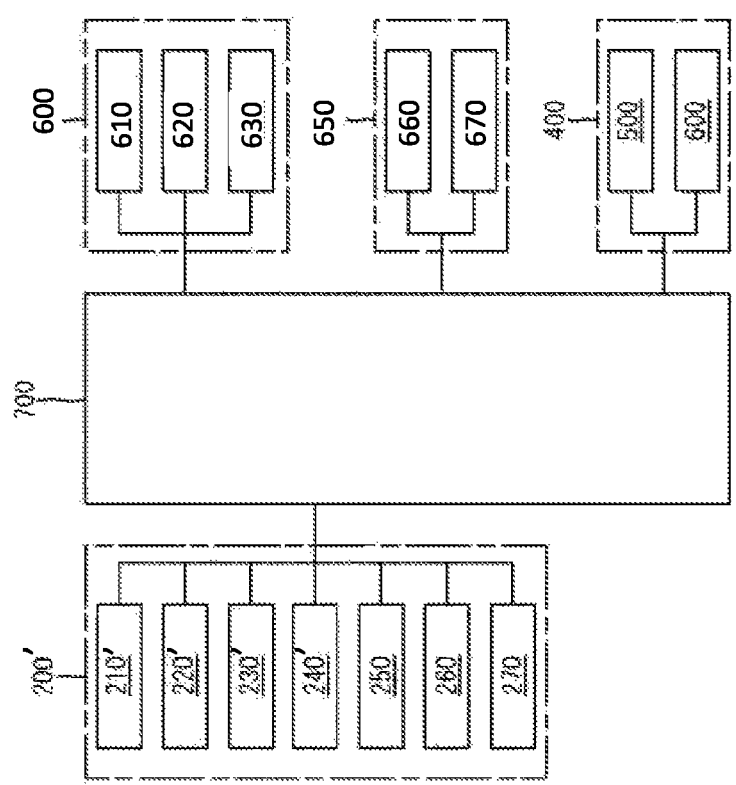
FIG. 18 is a schematic diagram showing a control system of the conveying processing system according to one embodiment of the present invention.

FIG. 16 shows a conveying processing system 500 according to one embodiment of the present invention. The conveying processing system 500 broadly comprises a conveying system 550, an unlocking system 600, a first robot arm 650 with a robot hand, a second robot arm 675 with a robot hand, and a control device 700 seen in FIG. 18. The conveying system 550, the unlocking system 600 and the second robot arm 675 with the robot hand are communicatively connected to the control device 700 as shown in FIG. 17.

With the conveying processing system 500, the bill storage container (BL or BS) is conveyed from a movable shelf 800 by the second robot arm 675 with the robot hand. Then, after the bill storage container (BL or BS) is unlocked by the unlocking system 600 and bills are removed from the bill storage container (BL or BS), the empty bill storage container (BL or BS) is conveyed to the movable shelf 800 by the second robot arm 675 with the robot hand.

There are two types of bill storage containers that may be subjected to the conveying processing system 500 according to the embodiments of the present invention. One is a bill storage container (BL) showed in FIGS. 19 and 20 and a second bill storage container (BS) is showed in FIGS. 21 and 22. The overall configuration of the bill storage containers (BL and BS) is substantially the same with the primary differences being the dimensions, position of a lock and the presence or absence of a protrusion portion (PT). The bill storage container (BL) has a width and depth substantially equal to those of the bill storage container (BS) but has a height greater than that of the bill storage container (BS). Further, the protrusion portion (PT) is attached to a side surface of the bill storage container (BS).

Figure 19:
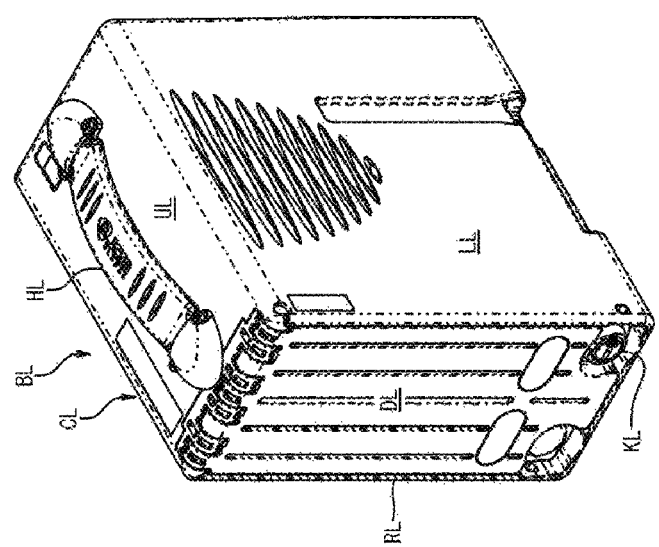
FIG. 19 is an external perspective view of a first exemplary bill storage container of the type to be conveyed and unlocked by the conveying processing system according to one embodiment of the present invention.
Figure 20:
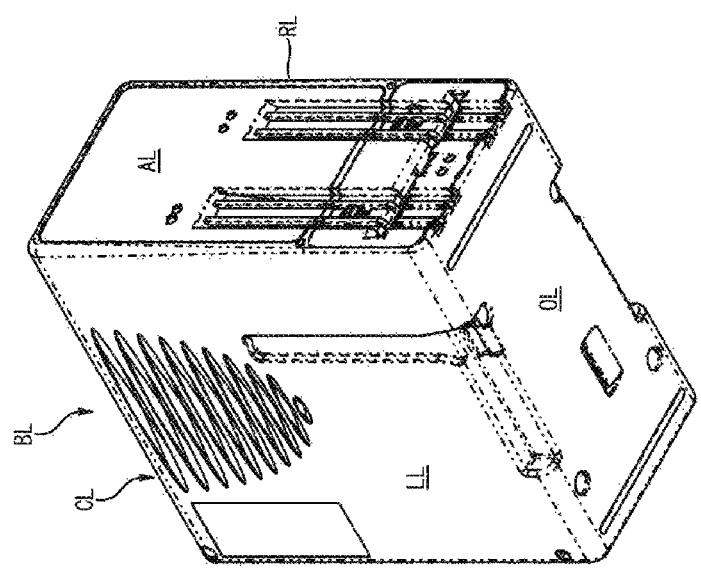
FIG. 20 is an external perspective view from the left obliquely below a back side of the first exemplary bill storage container of the type to be conveyed and unlocked by the conveying processing system according to one embodiment of the present invention.
Figure 21:
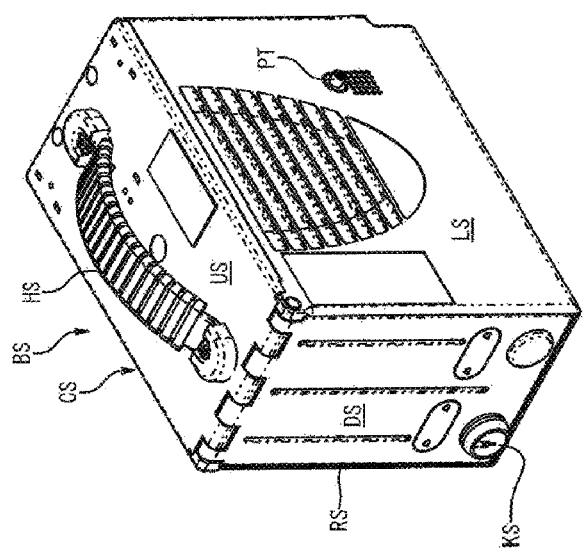
FIG. 21 is an external perspective view of a second exemplary bill storage container of the type to be conveyed and unlocked by the conveying processing system according to one embodiment of the present invention.
Figure 22:
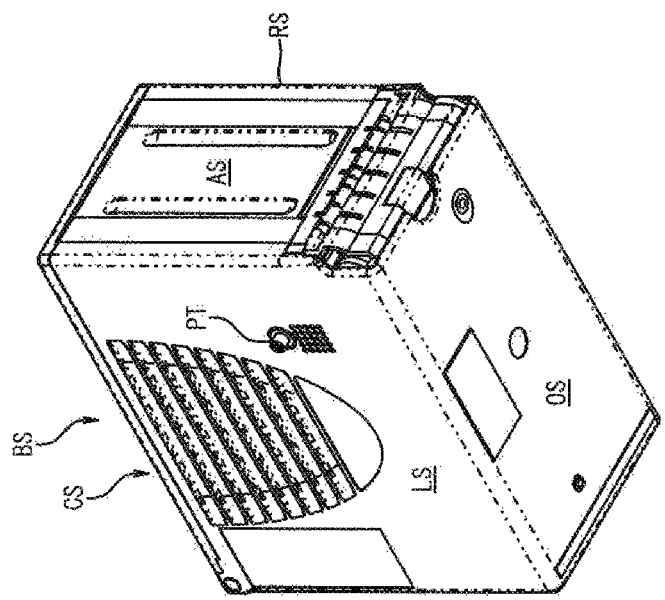
FIG. 22 is an external perspective view from the left obliquely below a back side of the second exemplary bill storage container of the type to be conveyed and unlocked by the conveying processing system according to one embodiment of the present invention.

As shown in FIGS. 19 and 20, the bill storage container (BL) broadly includes a housing (CL), a front door (DL), a handle (HL), and a lock (KL). The housing CL is formed from a top wall (UL), a bottom wall (OL), a right side wall (RL), a left side wall (LL) and a back wall (AL). The front door (DL) is attached to a front end of the top wall (UL) of the housing (CL) so as to be rotatable in the vertical direction. The handle (HL) is attached to the top wall (UL). In one embodiment, the lock (KL) is a conventional rotary lock and is disposed at a lower right corner of the front door (DL) (with the bill storage container (BS), a lock (KS) is disposed at a lower left corner of a front door (DS)). When a key is turned in the lock (KL), the lock opens and closes. Further, in an embodiment of the present invention, an IC tag or the like for storing information relevant to the bill storage container (BL) is embedded on a back side of the lock (KL) and the front door (DL) of the bill storage container (BL). The IC tag may store various types of information about the bill storage container (BL) such as the type of bill storage container (BL), identification information of a device such as a gaming machine, slot machine or the like, into which the bill storage container (BL) resides.

As shown in FIG. 17, the conveying conveyor system 500 has a substantially U-shape in a plan view, and broadly includes a first conveying-in conveyor 505, a conveying-in side posture changing device 510, a second conveying-in conveyor 515, a turntable (rotary table) 520, a first conveying-out conveyor 525, a conveying-out side posture changing device 530 and a second conveying-out conveyor 535.

The first conveying-in conveyor 505 extends linearly toward an installation side of the conveying-in side posture changing device 510 from an installation side of the second robot arm 675. A portion of an installation side of the second robot arm 675 with the robot hand of the first conveying-in conveyor 505 is a conveying-in position (EN) of the bill storage container (BL or BS). As shown in FIG. 17, the conveying-in position (EN) is within the graspable range of the second robot arm 675 with the robot hand. Further, the first conveying-in conveyor 505 is communicatively connected to the control device 700. Also, an output of a drive source of the first conveying-in conveyor 505 is controlled by the control device 700.

Figure 23:
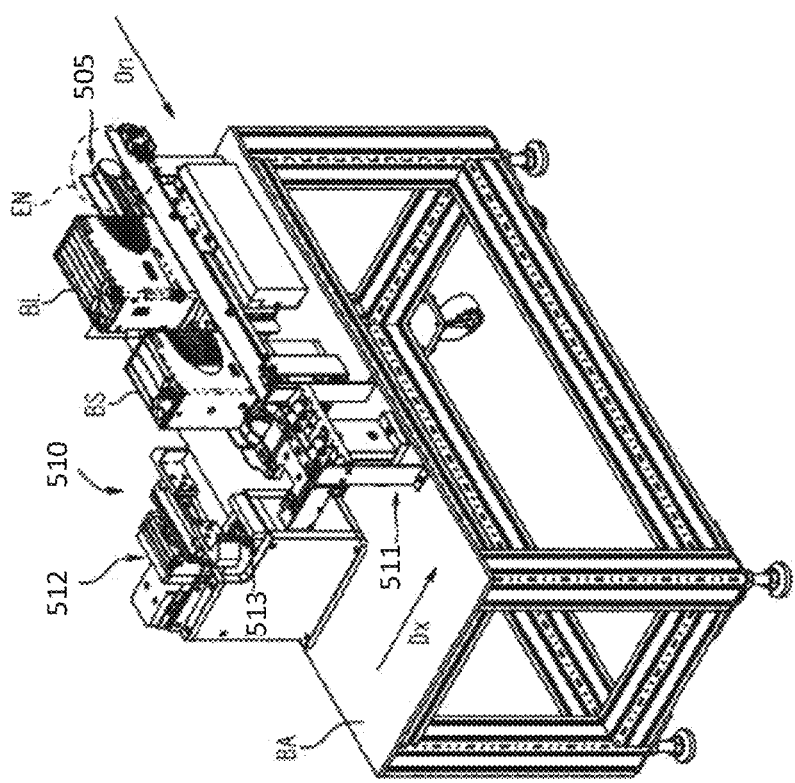
FIG. 23 is a perspective view of a first conveying-in conveyor and a conveying-in side posture changing device from the right obliquely above the conveying-in side posture changing device side of the conveying processing system according to one embodiment of the present invention.
Figure 24:
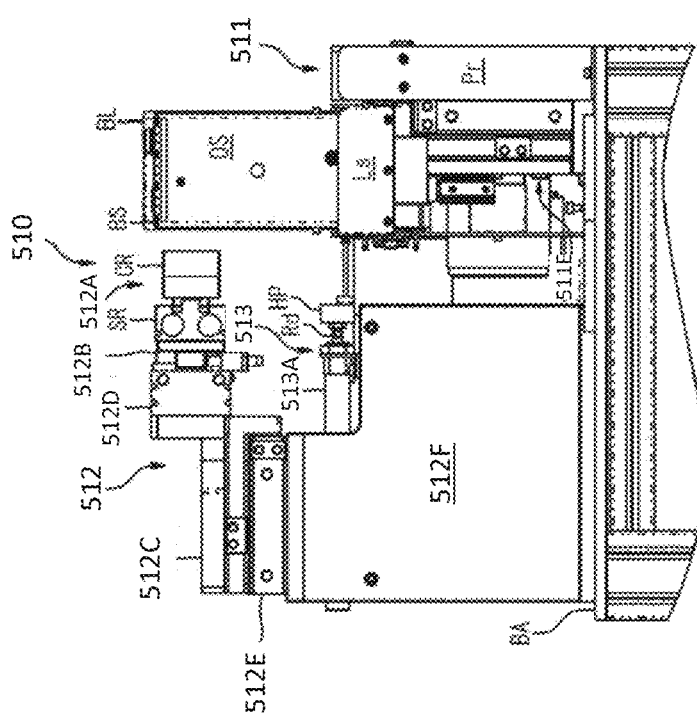
FIG. 24 is a back view of the first conveying-in conveyor and conveying-in side posture changing device of the conveying processing system according to one embodiment of the present invention.

As shown in FIGS. 23 and 24, the conveying-in side posture changing device 510 broadly includes an object support device 511, an object grasping rotation device 512, and an object push device 513. The object grasping rotation device 512 is disposed above the object push device 513, and the object grasping rotation device 512 and the object push device 513 are disposed immediately adjacent to the object support device 511 facing the object support device 511.

Figure 25:
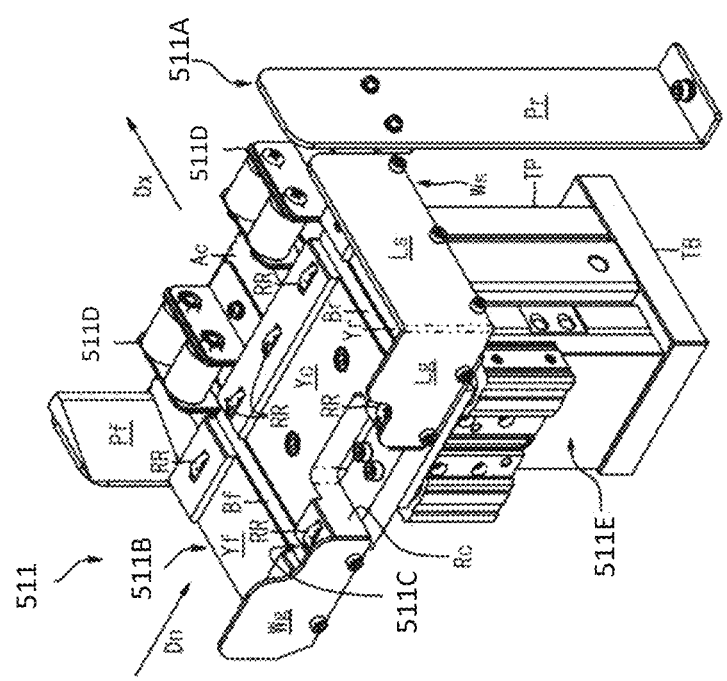
FIG. 25 is a perspective view of an object support device of the conveying-in side posture changing device of the conveying processing system according to one embodiment of the present invention.

The object support device 511 is configured to receive and support the bill storage container (BL or BS) conveyed from the first conveying-in conveyor 505. When the bill storage container (BL or BS) is vertically rotated 90° by the object grasping rotation device 512, the object support device 511 detects a vertical rotation operation by the object grasping rotation device 512. As shown in FIG. 25, the object support device 511 broadly includes a pedestal portion (TB), a column portion (TP), a front column plate portion (Pf), a rear column plate portion (Pr), an intersecting passage portion (Ac), a guide side wall (Wg), an L-shaped wall (Ws), an elevating table 511B, an elevating leg 511C, a conveying-out roller unit 511D, and an air cylinder unit 511E. Hereinafter, these configurations will be described in detail.

The pedestal portion (TB) is a thick plate member having a substantially rectangular shape and serves to fix the column portion (TP) to a base table (BA). The column portion (TP) is a thick plate member having a substantially rectangular shape and extends upward from the pedestal portion (TB). The column portion (TP) supports the air cylinder unit 511E.

The front column plate portion (Pf) and the rear column plate portion (Pr) are substantially rectangular plate members fixed to the base table (BA) and disposed to sandwich the column portion (TP). Further, the front column plate portion (Pf) and the rear column plate portion (Pr) are fastened to the intersecting passage portion (Ac). The intersecting passage portion (Ac) is disposed on the left side (the side of the second conveying-in conveyor 515) of the elevating table 511B and is supported by the front column plate portion (Pf) and the rear column plate portion (Pr).

The guide side wall (Wg) is a flat wall for guiding the bill storage container (BL or BS) being conveyed through the first conveying-in conveyor 505 to the elevating table 511 and is disposed on the right side of the front side of the elevating table 511B. The L-shaped wall (Ws) is a wall having an L-shape and formed of a guide side wall portion (Lg) and an abutting wall portion (Ls). The guide side wall portion (Lg) is a flat wall portion for guiding the bill storage container (BL or BS) being conveyed through the first conveying-in conveyor 505 to the elevating table 511B and is disposed on the right side of the rear side of the elevating table 511B. The abutting wall portion (Ls) acts as a stopper and is disposed on the rear side of the elevating table 511B. The abutting wall portion (Ls) serves to block the bill storage container (BL or BS) that is conveyed through the first conveying-in conveyor 505.

The elevating table 511B is formed from a front table portion (Yf), a central table portion (Yc), a rear table portion (Yr), and a table connecting portion (not shown). The front table portion (Yf), the central table portion (Yc) and the rear table portion (Yr) are connected at the left and right ends by the table connecting portion. Further, a slit is formed between the front table portion (Yf) and the central table portion (Yc) and between the central table portion (Yc) and the rear table portion (Yr). A front leg (Bf) and a rear leg (Br) of the elevating leg 511C are inserted through the two slits to be freely elevated. The front table portion (Yf) is a substantially rectangular thick plate portion. One roller (RR) is rotatably provided at each of the left and right portions of the front table portion (Yf). The rollers (RR) are rotatable along the conveying-in direction (Dn) of the bill storage container (BL or BS). The central table portion (Yc) is a thick plate portion having a substantially concave shape and a notch (Rc) formed on the right side. When a grasping portion 512A of the object grasping rotation device 512 takes on a vertical posture and its claw portion (CR) slides downward, the notch (Rc) prevents the claw portion (CR) from colliding with the elevating table 511B. Further, one roller (RR) is rotatably provided at each of the front and rear portions of the notch (Rc) of the central table portion (Yc) and three rollers (RR) are rotatably provided at the portion of the opposite side (left side) of the notch (Rc). The rollers (RR) are rotatable along the conveying-in direction (Dn) of the bill storage container (BL or BS). The rear table portion (Yr) is a substantially rectangular thick plate portion. Then, one roller (RR) is rotatably provided at each of the left and right portions of the rear table portion (Yr). The rollers (RR) are rotatable along the conveying-in direction (Dn) of the bill storage container (BL or BS). The elevating table 511B is disposed so that the notch (Rc) faces the object grasping rotation device 512. The elevating table 511B is attached to a first air cylinder of the air cylinder unit 511E and can be elevated by the first air cylinder. The uppermost position of the elevating table 511B is shown FIG. 25 while the lowermost position is where the bill storage container (BL or BS) does not collide with the elevating table 511B when the bill storage container (BL or BS) is rotated by the object grasping rotation device 512.

The elevating leg 511C not only serves to lift the bill storage container (BS) in order to allow the grasping portion 512A of the object grasping rotation device 512 to grasp the bill storage container (BS) at a central portion thereof and also serves as a rail to smoothly transport the bill storage container (BL or BS) to the conveying-out roller unit 511D after a posture of the bill storage container (BL or BS) is changed by the object grasping rotation device 512. The elevating leg 511C, as shown in FIG. 25, is broadly formed of a front leg (Bf), a rear leg (Br) and a leg connecting portion (not shown). The front leg (Bf) is disposed in the slit of the front side of the elevating table 511B. The rear leg (Br) is disposed in the slit of the rear side of the elevating table 511B. In one embodiment, the leg connecting portion is a beam member extending from font to back connecting the front leg (Bf) and the rear leg (Br) at its back side. The leg connecting portion is disposed so as not to overlap with the table connecting portion of the elevating table 511B. The elevating leg 511C is attached to a second air cylinder of the air cylinder unit 511E and can be elevated by the second air cylinder. The uppermost position of the elevating leg 511C is at a height at which the grasping portion 512A can grasp the central portion of the bill storage container (BS) having a short height and is positioned slightly higher than the conveying-out roller unit 511D. The lowermost position of the elevating leg 511C is a position lower than the top surface of the elevating table 511B.

The conveying-out roller unit 511D is for transporting the bill storage container (BL or BS) after the posture is changed by the object grasping rotation device 512 to the second conveying-in conveyor 515 and is disposed on both sides of the intersecting passage portion (Ac) as shown in FIG. 25.

The air cylinder unit 511E is attached to the column portion (TP). The air cylinder unit 511E includes a first air cylinder and the second air cylinder. As detailed above, the first air cylinder elevates the elevating table 511B and the second air cylinder elevates the elevating leg 511C. The first air cylinder and the second air cylinder are operated by air flow and air pressure generated using a solenoid valve (not shown) and a speed regulating valve (not shown) which are controlled to open and close by the control device 700. The solenoid valve and speed regulating valve are connected to a compressor.

Figure 26:
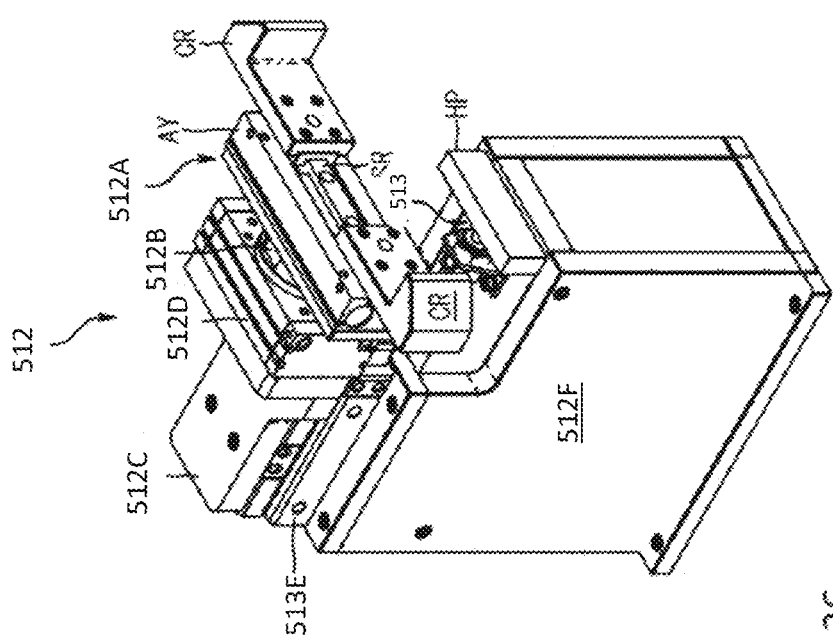
FIG. 26 is a perspective view of an object grasping rotation device of the conveying-in side posture changing device of the conveying processing system according to one embodiment of the present invention.
Figure 27:
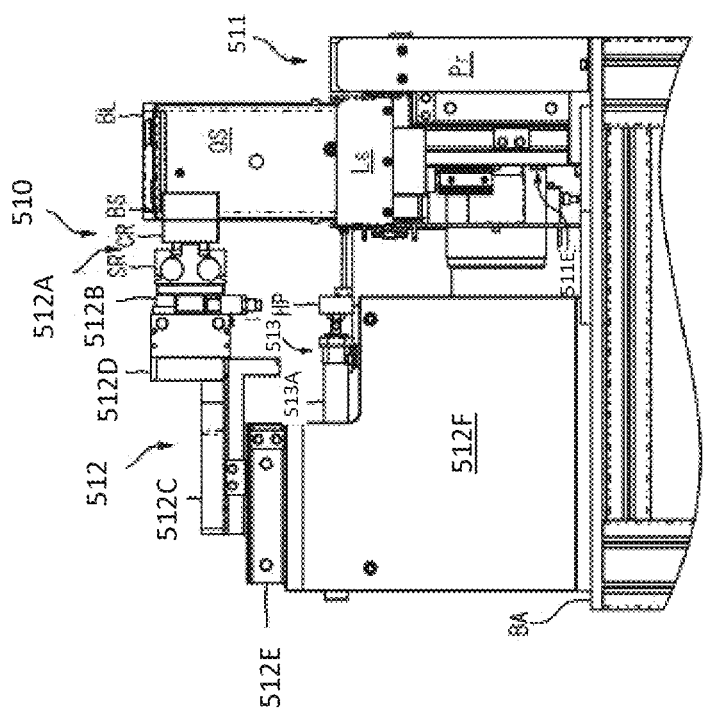
FIG. 27 is a back view of the conveying-in side posture changing device in a state wherein a slider of the object grasping rotation device is moved forward grasping a bill storage container according to one embodiment of the present invention.

As shown in FIGS. 26 and 27, the object grasping rotation device 512 is a rotary chuck device and broadly includes a grasping portion 512A, a rotation shaft portion 512B, a slider 512C, a first air cylinder 512D, a second air cylinder 512E, and a pedestal 512F as shown in FIG. 26.

The grasping portion 512A broadly includes a pair of claw members (CR), a slide rail member (SR) and a third air cylinder. The pair of claw members (CR) are slidably attached to the left and right of the slide rail portion (SR). The claw members (CR) are spread or narrowed along the slide rail portion (SR) by the third air cylinder. The third air cylinder is attached to the slide rail portion (SR) and is operated by air flow and air pressure generated using a solenoid valve (not shown) and a speed regulating valve (not shown) which are controlled to open and close by the control device 700. The solenoid valve and speed regulating valve are connected to a compressor.

The rotation shaft portion 512B is attached to the rear side of the third air cylinder unit of the grasping portion 512A and is rotatable by 90° clockwise or 90° counterclockwise by the first air cylinder 512D. That is, when the rotation shaft portion 512B is rotated by the first air cylinder 512D, the grasping portion 512A also rotates.

The slider 512C is attached to the rear side of the first air cylinder 512D and can slide the grasping portion 512A, the first air cylinder 512D and the rotation shaft portion 512B in the lateral direction (i.e., the direction toward the object support device 511) by the second air cylinder unit 512E. The foremost position of the slider 512C is a position at which the grasping portion 512A is able to grasp the bill storage container (BL or BS) and the rearmost position is a position at which the bill storage container (BL or BS) when transported to the object support device 511 does not collide with the grasping portion 512A.

The first air cylinder 512D is a rotary air cylinder and is fixed to the slider 512C. As described above, this first air cylinder 512D is configured to rotate the grasping portion 512A by 90° clockwise or 90° counterclockwise. The first air cylinder 512D is operated by air flow and air pressure generated using a solenoid valve (not shown) and speed regulating valve (not shown) which are controlled to open and close by the control device 700. The solenoid valve and this speed regulating valve are connected to a compressor.

The second air cylinder 512E is fixed on the pedestal 512F. As described above, the second air cylinder unit 512E slides the slider 512C in the lateral direction. The second air cylinder unit 512E, like the first air cylinder 512D, is operated by air flow and air pressure generated using a solenoid valve (not shown) and the speed regulating valve (not shown) which are controlled to open and close by the control device 700.

As shown in FIG. 24, the object push device 513 broadly includes a piston rod (Rd), an abutting plate (HP) and an air cylinder 513A. The piston rod (Rd) is retractable by means of the air cylinder 513A. The abutting plate (HP) is attached to the distal end of the piston rod (Rd). The abutting plate (HP) is positioned behind the grasping portion 512A of the object grasping rotation device 512 in a standby state and then moves to a position ahead of the grasping portion 512A when operating (i.e., when pushing out). The moving distance of the abutting plate (HP) is a distance required to transport the bill storage container (BL or BS) to the second conveying-in conveyor 515 via the conveying-out roller unit 511D.

The air cylinder 513A is disposed behind the abutting plate (HP). The air cylinder 513A protrudes and retracts the piston rod (Rd) as described above. Like the other air cylinders, the air cylinder 513A is operated by air flow and air pressure generated using a solenoid valve (not shown) and speed regulating valve (not shown) which are controlled to open and close by the control device 700. Also, like the other solenoids and speed regulating valves, this solenoid valve and this speed regulating valve are connected to a compressor.

A control mode in which the conveying-in side posture changing device 510 changes the posture of the bill storage container (BL and BS) (i.e., a control mode in which the conveying-in side posture changing device 510 rotates the bill storage container (BL or BS) vertically). With the conveying-in side posture changing device 510, the bill storage container (BL or BS) is identified by reading data in a RFID tag embedded in the bill storage container (BL or BS). Whether the top wall (UL or US) or the bottom wall (OL or OS) of the bill storage container (BL or BS) faces the front is determined based on image data obtained by an imaging device (not shown) disposed above the object support device 511.

The conveying-in side posture changing device 510 is initially in the state shown in FIGS. 23 and 24. Now described is a process with the bill storage container (BL). When the bill storage container (BL) is conveyed to the elevating table 511B of the object support device 511, the state is detected by an infrared sensor (not shown) disposed near the L-shaped wall (Ws) of the object support device 511 with a detection signal being transmitted to the control device 700. Once the control device 700 receives the detection signal, the control device 700 lifts the elevating table 511B of the object support device 511 to an uppermost position. Next, after the control device 700 advances the slider 512C of the object grasping rotation device 512, the control device 700 causes the grasping portion 512A of the object grasping rotation device 512 to grasp the bill storage container (BL). Next, the control device 700 lowers the elevating table 511B of the object support device 511 to a lowermost position. Next, the control device 700 rotates the grasping portion 512A of the object grasping rotation device 512 by 90° clockwise or 90° counterclockwise by means of the first air cylinder 512D of the object grasping rotation device 512. When the bottom wall (OL) of the bill storage container (BL) faces forward (i.e., the conveying-in direction (Dn)), the first air cylinder 512D rotates the grasping portion 512A in the counterclockwise direction (i.e., the direction that the top wall (UL) faces upward), and when the top wall (UL) of the bill storage container (BL) faces forward, the first air cylinder 512D rotates the grasping portion 512A in the clockwise direction (i.e., the direction that the top wall (UL) faces upward). Subsequently, the control device 700 lifts the elevating table 5111B of the object support device 511 to the uppermost position and lifts the elevating leg 511C to the uppermost position. At this time, the elevating leg 511C abuts against the bottom wall (OL) of the bill storage container (BL) to support the bill storage container (BL). Then, the control device 700 causes the grasping portion 512A to release the bill storage container (BL), and next retreats the slider 512C of the object grasping rotation device 512. Thereafter, the control device 700 pushes the bill storage container (BL) from the elevating table 511B using the air cylinder 513A of the object push device 513 and moves the bill storage container (BL) to the second conveying-in conveyor 515 via the conveying-out roller unit 511D.

Now is described the process with the bill storage container (BS). When, the control device 700 receives the detection signal from the infrared sensor, the control device 700 lifts the elevating table 511B and the elevating leg 511C of the object support device 511 to their respective uppermost positions. Next, after the control device 700 advances the slider 512C of the object grasping rotation device 512, the control device 700 causes the grasping portion 512A of the object grasping rotation device 512 to grasp the bill storage container (BS). Next, the control device 700 lowers the elevating table 511B and the elevating leg 511C of the object support device 511 to the lowermost position. Next, the control device 700 rotates the grasping portion 512A of the object grasping rotation device 512 by 90° clockwise or 90° counterclockwise by means of the first air cylinder 512D of the object grasping rotation device 512. When the bottom wall (OS) of the bill storage container (BS) faces forward (i.e., the conveying-in direction (Dn)), the first air cylinder 512D rotates the grasping portion 512A in the counterclockwise direction (i.e., the direction that the top wall (US) faces upward), and when the top wall (US) of the bill storage container (BS) faces forward, the first air cylinder 512D rotates the grasping portion 522A in the clockwise direction (i.e., the direction that the top wall (US) faces upward). Subsequently, the control device 700 lifts the elevating table 511B of the object support device 511 to the uppermost position and lifts the elevating leg 511C to the uppermost position. At this time, the elevating leg 511C abuts against the bottom wall (OS) of the bill storage container (BS) to support the bill storage container (BS). The remaining operations as similar to those described relative to the bill storage container (BL).

The second conveying-in conveyor 515 is an automatic conveyor and extends linearly toward an installation side of the turntable 520 from an installation side of the conveying-in side posture changing device 510. A conveying direction of the second conveying-in conveyor 515 is perpendicular to the conveying-in direction (Dn) of the first conveying-in conveyor 505. The second conveying-in conveyor 515 is communicatively connected to the control device 700. Then, an output of a drive source of the second conveying-in conveyor 515 is controlled by the control unit 700.

The turntable 520 rotates an object placed thereon along a horizontal plane. The turntable 520 is communicatively connected to the control device 700. Then, an output and a rotation angle of a drive source of the turntable 520 are controlled by the control device 700.

The first conveying-out conveyor 525 is an automatic and extends linearly toward an installation side of the conveying-out side posture changing device 530 from an installation side of the turntable 525. A conveying-out direction of the first conveying-out conveyor 525 is the same direction as the conveying-in direction of the second conveying-in conveyor 515 and is perpendicular to the conveying-in direction (Dn) of the first conveying-in conveyor 505. The first conveying-out conveyor 525 is communicatively connected to the control device 700. Then, an output of a drive source of the first conveying-out conveyor 525 is controlled by the control device 700.

Figure 28:
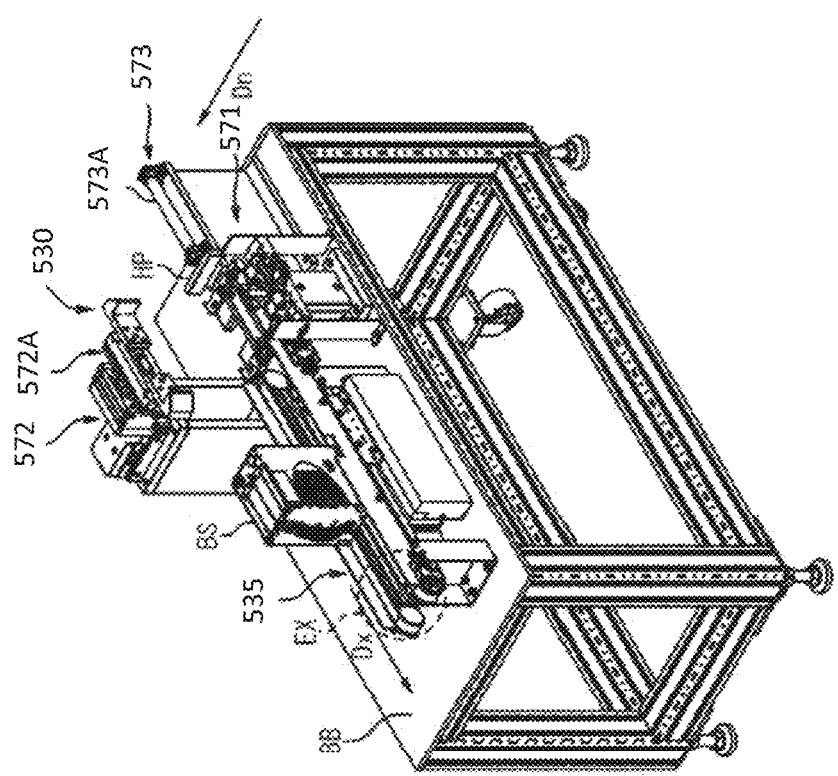
FIG. 28 is a perspective view of a conveying-out, side posture changing device and a second conveying-out conveyor viewed from the right obliquely above the second conveying-out conveyor of the conveying processing system according to one embodiment of the present invention.
Figure 29:
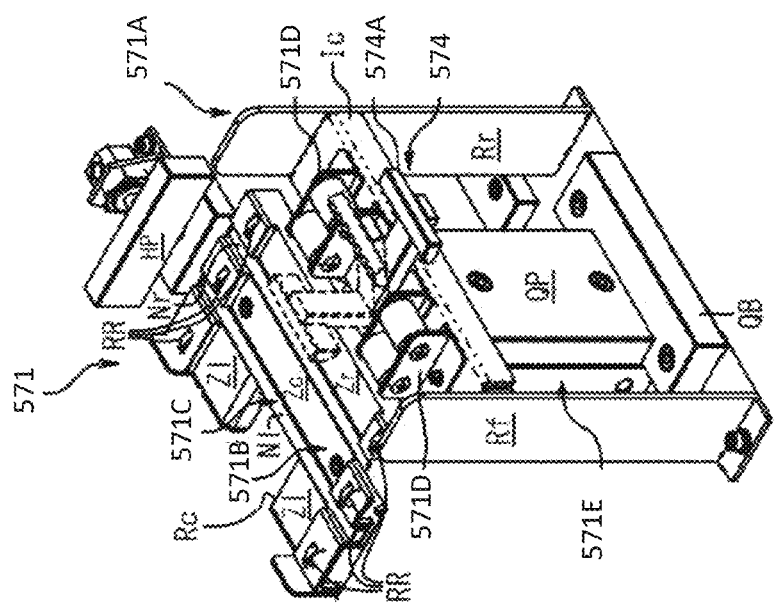
FIG. 29 is a perspective view of an object support device of the conveying-out, side posture changing device of the conveying processing system according to one embodiment of the present invention.

As shown in FIGS. 28 and 29, the conveying-out side posture changing device 530 broadly includes an object support device 571, an object grasping rotation device 572, an object push device 573, and an object pulling device 574. The object grasping rotation device 572 is disposed immediately adjacent to the object support device 511 so as to face the object support device 511, and the object push device 573 is disposed behind the object support device 511. Further, the object pulling device 574 is disposed on the object support device 571.

The object support device 571 functions to receive and support the bill storage container (BL or BS) conveyed from the first conveying-out conveyor 525 and functions to realize a vertical rotation operation by the object grasping rotation device 572 when the bill storage container (BL or BS) is vertically rotated by 90° by the object grasping rotation device 572. As shown in FIG. 29, the object support device 571 broadly includes a pedestal portion (QB), a column portion (QP), a front column plate portion (RI), a rear column plate portion (Rr), an intersecting passage portion (Ic), an elevating table 571B, an elevating leg 571C, a conveying-in roller unit 571D, and an air cylinder unit 571E.

The pedestal portion (QB) is a thick plate member having a substantially rectangular shape as shown in FIG. 29 and serves to fix the column portion (QP) to a base table (BB). The column portion (QP) is a thick plate member having a substantially rectangular and extends upward from the pedestal portion (QB). The column portion (QP) supports the air cylinder unit 571E.

The front column plate portion (Rf) and the rear column plate portion (Rr) are substantially rectangular plate members, are disposed so as to sandwich the column portion (QP) and are fixed to the base table (BB). The upper portion of the front column plate portion (Rf) and the rear column plate portion (Rr) serve to guide the bill storage container (BL or BS) that is conveyed through the first conveying-out conveyor 525 to the elevating table 571B. Further, as shown in FIG. 29, the front column plate portion (Rf) and the rear column plate portion (Rr) are adjacent to the intersecting passage portion (Ic).

The intersecting passage portion (Ic) is disposed on the right side (i.e., the first conveying-out conveyor side) of the elevating table 571B and is supported by the front column plate portion (Rf) and the rear column plate portion (Rr). As shown in FIG. 29, a conveying-in roller unit 571D is disposed in front and rear of the intersecting passage portion (Ic) and the object pull device 574 is disposed in the center thereof.

The elevating table 571B is formed from a left table portion Zl, a central table portion (Zc), a right table portion (Zr) and a table connecting portion (not shown). The left table portion (Zl), the central table portion (Zc) and the right table portion (Zr) are connected by the table connecting portion at the front and rear ends. Further, as shown in FIG. 29, a slit is formed between the left table portion (Zl) and the central table portion (Zc) and between the central table portion (Zc) and the right table portion (Zr) in this elevating table 571B. A left leg (Nl) and a right leg (Nr) of the elevating leg 571C are inserted through the two slits so as to be freely elevated. The left table portion (Zl) is a substantially rectangular thick plate portion having a notch (Rc) at the center. When the grasping portion of the object grasping rotation device 572 is in a vertical posture and its claw portion slides downward, the notch (Rc) prevents the claw portion from colliding with the elevating table 571B. One roller (RR) is rotatably provided at each of the front and rear portions of this left table portion (Zl). The rollers (RR) are rotatable along the conveying-in direction (Dn) of the bill storage container (BL or BS). The central table portion (Zc) is a thick plate portion having a substantially rectangular shape. Further, as shown in FIG. 29, one roller (RR) is rotatably provided at each of the front and rear portions of the central table portion (Zc). The rollers (RR) are rotatable along the conveying-in direction (Dn) of the bill storage container (BL or BS). The right table portion (Zr) is a substantially rectangular thick plate portion. One roller (RR) is rotatably provided at each of the front and rear portions of the right table portion (Zr). The rollers (RR) are rotatable along the conveying-in direction (Dn) of the bill storage container (BL or BS). The elevating table 571B is disposed so that the notch (Rc) faces the object grasping rotation device 572. The elevating table 571B is attached to a first air cylinder of the air cylinder unit 571E and can be elevated by the first air cylinder. The uppermost position of the elevating table 571B is the position shown in FIG. 29 with the lowermost position such that the bill storage container (BL or BS) does not collide with the elevating table 571B when the bill storage container (BL or BS) is rotated by the object grasping rotation device 572.

The elevating leg 571C not only serves to lift the bill storage container (BS) in order to allow the grasping portion 572A of the object grasping rotation device 572 to grasp the bill storage container (BS) at a central portion thereof, but also serves as a rail that smoothly transports the bill storage container (BS) to the second conveying-out conveyor 535 after a posture of the bill storage container (BS) is changed by the object grasping rotation device 512. As shown in FIG. 29, the elevating leg 571C is formed from a left leg (Nl), a right leg (Nr) and a leg connecting portion (not shown). The left leg (Nl) is disposed in the slit on the left side of the elevating table 571B. The right leg (Nr) is disposed in the slit of the right side of the elevating table 571B. The leg connecting portion is a beam member extending in the lateral direction connecting the left leg (Nl) and the right leg (Nr) at its back side. The leg connecting portion is disposed so as not to overlap with the table connecting portion of the elevating table 571B. The elevating leg 571C is attached to a second air cylinder of the air cylinder unit 571E and can be elevated by the second air cylinder. The uppermost position of the elevating leg 571C is a height at which the grasping portion 512A of the object grasping rotation device 512 can grasp the central portion of the bill storage container (BS) having a short height and is in a position slightly higher than the conveying-in roller unit 571D. The lowermost position of the elevating leg 571C is a position lower than the top surface of the elevating table 571B.

Since the object grasping rotation device 572 is the same as the object grasping rotation device 512 of the conveying-in side posture changing device 510. The object push device 573 includes a piston 573A and an air cylinder unit (not shown).

The piston 573A may be retracted by the air cylinder unit. The abutting plate (HP) is attached to the distal end of the piston 573A. The abutting plate (HP) of the piston 573A is positioned behind the object support device 571 in a standby state and moves to a position ahead of the object support device 571 when operating (i.e., that is, when pushing out). The moving distance of the abutting plate (HP) of the piston 573A is a distance required to transport the bill storage container (BL or BS) to the second conveying-out conveyor 535.

The air cylinder unit is disposed behind the piston 573A. As described above, the air cylinder unit protrudes and retracts the piston 573A. The air cylinder unit is operated by air flow and air pressure generated using a solenoid valve (not shown) and a speed regulating valve (not shown) which are controlled to open and close by the control device 700. The solenoid valve and the speed regulating valve are connected to a compressor.

The object pull device 574 includes a pull member 574A, a rotary cylinder (not shown) and a bearing (not shown). The bearing is provided on the front column plate portion (Rf) and the rear column plate portion (Rr). The pull member 574A is supported by the bearing rotatably. That is, the pull member 574A is disposed between the pair of conveying-in roller units 571D. The pull member 574A is operated by the rotary cylinder.

A control mode in which the conveying-out side posture changing device 530 changes the posture of the bill storage container (BL or BS) is now described. In the conveying-out side posture changing device 530, the bill storage container (BL or BS) is identified by reading the data in the RFID tag embedded in the bill storage container (BL or BS). Whether the top wall (UL or US) or the bottom wall (OL or OS) of the bill storage container (BL or BS) faces the front is determined based on image data obtained by an imaging device (not shown) disposed above the object support device 511.

Now described is a process involving the bill storage container (BL). The conveying-out side posture changing device 535 is initially in the state shown in FIGS. 28 and 29. When the bill storage container (BL) is conveyed in this state to being placed on the elevating table 571B of the object support device 571, the state is detected by an infrared sensor (not shown) disposed near the rear column plate portion (Rr) of the object support device 571 and then a detection signal is transmitted to the control device 700. When the control device 700 receives the detection signal, the control device 700 operates the object pull device 574 to completely place the bill storage container (BL) on the elevating table 571B by the pull member 574A. Next, the control device 700 lifts the elevating table 571B of the object support device 571 to the uppermost position. Then, after the control device 700 advances the slider of the object grasping rotation device 572, the control device 700 causes the grasping portion 572A of the object grasping rotation device 572 to grasp the bill storage container (BL). Next, the control device 700 lowers the elevating table 571B of the object support device 571 to the lowermost position. Next, the control device 700 rotates the grasping portion 572A of the object grasping rotation device 572 by 90° counterclockwise relative to the conveying-in direction (Dn) by means of the air cylinder (rotary air cylinder) of the object grasping rotation device 572. When the bill storage container (BL) is rotated by 90° clockwise, the bill storage container (BL) assumes a posture in which the bottom wall (OL) faces the front (i.e., a conveying-out direction (Dx)), and when the bill storage container (BL) is rotated by 90° counterclockwise, the bill storage container (BL) assumes a posture in which the top wall (UL) faces the front (i.e., the conveying-out direction (Dx)). The rotation direction of the grasping portion 572A of the object grasping rotation device 572 is appropriately determined by the control device 700 (e.g., the rotation direction is determined based on the placing pattern of the bill storage container (BL) on the movable shelf 800). Subsequently, the control device 700 lifts the elevating table 571B of the object support device 571 to the uppermost position and lifts the elevating leg 571C to the uppermost position. At this time, the elevating leg 571C abuts against the back wall (AL) of the bill storage container (BL) to support the bill storage container (BL). Then, the control device 700 causes the grasping portion 572A to release the bill storage container (BL), and then retreats the slider of the object grasping rotation device 572. Thereafter, the control device 700 pushes the bill storage container (BL) from the elevating table 571B by the piston 573A of the object push device 573 and moves the bill storage container (BL) to the second conveying-out conveyor 535.

Now described is a process involving the bill storage container (BS). When the control device 700 completely places the bill storage container (BS) on the elevating table 571B by the pull member 574A, the control device 700 lifts the elevating leg 571C of the object support device 571 to the uppermost position. Next, after the control device 700 advances the slider of the object grasping rotation device 572, the control device 700 causes the grasping portion 572A of the object grasping rotation device 572 to grasp the bill storage container (BS). Next, the control device 700 lowers the elevating table 571B and the elevating leg 571C of the object support device 571 to the lowermost position. Subsequently, the control device 700 rotates the grasping portion 572A of the object grasping rotation device 572 by 90° counterclockwise relative to the conveying-in direction (Dn) by a rotation portion of the object grasping rotation device 572. Subsequently, the control device 700 lifts the elevating table 571B of the object support device 571 to the uppermost position and lifts the elevating leg 571C to the uppermost position. At this time, the elevating leg 571C abuts against the back wall (AS) of the bill storage container (BS) to support the bill storage container (BS). The remaining operations are similar to those described relative to the bill storage container (BL).

The second conveying-out conveyor 535 is an automatic conveyor and extends linearly toward the installation side of the second robot arm 675 with the robot hand from the installation side of the conveying-out side posture changing device 530, a portion of an installation side of the second robot arm 675 with the robot hand of the second conveying-out conveyor 535 is a conveying-out position (EX) of the bill storage container (BL or BS). The conveying-out position (EX) is within the graspable range of the second robot arm 675 with the robot hand. The conveying-out direction (Dx) of the second conveying-out conveyor 535 is perpendicular to the conveying direction of the second conveying-in conveyor 515 and the first conveying-out conveyor 525 and is parallel to the conveying-in direction (Dn) of the first conveying-in conveyor 505. The second conveying-out conveyor 535 is communicatively connected to the control device 700. Then, an output of a drive source of the second conveying-out conveyor 535 is controlled by the control device 700.

The unlocking system 600 includes a robot arm 610 with a key, an imaging device 620, an object detection device 630 and the first robot arm 650 with the robot hand. The robot arm 610 has a key attached to the distal end thereof. The type of the robot arm used is not particularly limited, and may be, for example, an existing six-axis robot arm or the like. The distal end portion of the robot arm is a rotatable structure allowing the key to be rotated by the distal end portion of the robot arm. The robot arm 610 with the key not only serves to open the lock (KL or KS) of the bill storage container (BL or BS) and to pull up and open the front door (DL or DS) and also serves to thereafter close the front door (DL or DS) of the bill storage container (BL or BS) and to lock the lock (KL or KS).

The imaging device 620 is fixed near the robot arm 610 with the key. The imaging device 620 captures the bill storage container (BL or BS) according to an instruction of the control device 700 to generate image data and transmits the image data to the control device 700. Then, the control device 700 analyzes the image data and specifies the type of the bill storage container (BL or BS).

The object detection device 630 is fixed near the robot arm 610 with the key. The object detection device 630 performs RFID communication with the IC tag of the bill storage container (BL or BS) in accordance with an instruction of the control device 700, reads various data of the IC tag, and transmits the various data to the control device 700. Then, the control device 700 analyzes the image data and specifies the type of the bill storage container (BL or BS). Then, based on the various data and the image data from the imaging device 620, the control device 700 acquires the data of the type and dimensions of the bill storage container (BL or BS), and derives the coordinate data of the lock (KL or KS) and the angle data of the lock (KL or KS). Next, the control device 700 generates the control signal based on those data, transmits the control signal to the robot arm 610 with the key, and causes the robot arm 610 with the key to execute the unlocking processing of the bill storage container (BL or BS). Further, when the control device 700 determines that the locks (KL or KS) do not exist in the bill storage container (BL or BS) in the image data, the control device 700 controls the turntable 520 to change the direction of the bill storage container (BL or BS).

The first robot arm 650 with the robot hand according to an embodiment of the present invention includes a robot arm 660 and a first robot hand 670. The first robot arm 650 with the robot hand serves to pull the bill from the bill storage container (BL or BS) with the front door (DL or DS) opened.

The first robot hand 670 serves to pull a bill from the bill storage container (BL or BS) with the front door (DL or DS) open. An imaging device 680 for recognizing the coordinate data of the lock (KL or KS), the angle data of the lock (KL or KS) and the presence or absence of the bill is attached to the first robot hand 670.

Although the invention has been described in detail with reference to several embodiments, additional variations and modifications exist within the scope and spirit of the invention as described.

The invention claimed is:
1. An object conveying robot comprising:
a robot hand including an articulated telescopic link mechanism configured to telescope by moving a plurality of nodes along a first virtual plane and a grasping portion attached to a distal end side of the articulated telescopic link mechanism;
a hand moving mechanism connected to the robot hand; and
wherein the robot hand assumes a posture in which the first virtual plane is parallel to a substantially vertical direction at least at the time of extension and contraction of the articulated telescopic link mechanism;
wherein the articulated telescopic link mechanism includes:
a first node,
a second node intersecting a central portion of the first node at a central portion, a first
connecting pin for rotatably connecting the first node and the second node about an intersection,
a first slider connected to a base end portion of the first node, the first slider configured to slide along a direction parallel to the first virtual plane and orthogonal to a telescopic direction;

a support portion rotatably supporting a base end portion of the second node;

a third node intersecting a distal end portion of the first node at a base end portion thereof, and a second connecting pin for rotatably connecting the first node and the third node about an intersection;

a second slider directly connected to the second connecting pin, the second slider configured to slide along a telescopic direction; and a drive source for driving the second slider;

wherein the drive source drives the second slider via a ball screw; and wherein the ball screw is directly connected to the second slider.

2. The object conveying robot according to claim 1, wherein:

the articulated telescopic link mechanism includes a telescopic structure composed of the plurality of nodes; and the robot hand further includes a biasing portion for biasing the telescopic structure of the articulated telescopic link mechanism to a base end side of the articulated telescopic link mechanism.

3. The object conveying robot according to claim 2, further comprising:

a detachable structure allowing the biasing portion to be detached.

4. The object conveying robot according to claim 1 wherein:

the robot hand further includes a support member for supporting the grasping portion; and a pair of distance sensors for measuring a distance in a direction parallel to the telescopic direction.

5. The object conveying robot according to claim 1 wherein:

the robot hand further includes a support member for supporting the grasping portion and a pair of rollers whose rotation axis is parallel to the first virtual plane and is in a direction orthogonal to the telescopic direction.

6. The object conveying robot according to claim 1, wherein:

at least one of a distal end portion of the articulated telescopic link mechanism and the grasping portion includes a pair of wheels whose rotation axis is in a direction orthogonal to the first virtual plane.

7. The object conveying robot according to claim 1 wherein:

the grasping portion is a suction member for suctioning a box body having a handle; and further comprising a plurality of suction members disposed so as to sandwich the handle when contacting a handle surface of the box body.

* * * * *